United States Patent
Kim

(10) Patent No.: US 11,876,624 B2
(45) Date of Patent: Jan. 16, 2024

(54) METHOD FOR TRANSMITTING DATA BY MEANS OF TERMINAL IN WIRELESS COMMUNICATION SYSTEM SUPPORTING SIDELINK, AND DEVICE THEREFOR

(71) Applicant: LG Electronics Inc., Seoul (KR)

(72) Inventor: Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 17/613,376

(22) PCT Filed: Jul. 6, 2020

(86) PCT No.: PCT/KR2020/008807
§ 371 (c)(1),
(2) Date: Nov. 22, 2021

(87) PCT Pub. No.: WO2021/002736
PCT Pub. Date: Jan. 7, 2021

(65) Prior Publication Data
US 2022/0216947 A1    Jul. 7, 2022

(30) Foreign Application Priority Data
Jul. 4, 2019   (KR) .................. 10-2019-0080641

(51) Int. Cl.
*H04L 1/16* (2023.01)
*H04W 72/54* (2023.01)
*H04W 72/56* (2023.01)

(52) U.S. Cl.
CPC .............. *H04L 1/16* (2013.01); *H04W 72/54* (2023.01); *H04W 72/56* (2023.01)

(58) Field of Classification Search
CPC ....................................................... H04L 1/16
See application file for complete search history.

(56) References Cited

U.S. PATENT DOCUMENTS 11,388,753 B2 *  7/2022  Sun ..................... H04L 5/0055
2011/0217973 A1 *  9/2011  Sagfors ................. H04L 69/32
                                                                  455/423

(Continued)

FOREIGN PATENT DOCUMENTS

KR         20080035439         4/2008
KR         20170110069         10/2017

OTHER PUBLICATIONS

InterDigital Inc.re, "Support of NR Sidelink Unicast and Groupcast," R1-1811209, Presented at 3GPP TSG RAN WG1 Meeting #94bis, Chengdu, China, Oct. 8-12, 2018, 4 pages.

(Continued)

*Primary Examiner* — Edan Orgad
*Assistant Examiner* — Won Tae C Kim
(74) *Attorney, Agent, or Firm* — Fish & Richardson P.C.

(57) ABSTRACT

A method for transmitting data by a first user equipment (UE) in a wireless communication system supporting a sidelink includes transmitting a first set of data to a second UE through a first link; receiving a first message requesting a beam search; and transmitting a second set of data through a second link formed on the basis of the first message, wherein the first UE, upon suspension of transmission of the first set of data for forming the second link, transmits a third set of data, which is a retransmission of the first set of data, after completion of the transmission of the second set of data, and wherein the third set of data has configured therein a second redundancy version (RV) which is different from a first RV configured in the first set of data.

10 Claims, 22 Drawing Sheets

(56) References Cited

U.S. PATENT DOCUMENTS

| | | | | |
|---|---|---|---|---|
| 2016/0352625 A1* | 12/2016 | Kim | ......................... | H04L 1/188 |
| 2017/0257876 A1* | 9/2017 | Loehr | .................... | H04W 72/56 |
| 2018/0206260 A1* | 7/2018 | Khoryaev | ......... | H04W 72/1263 |
| 2018/0254863 A1* | 9/2018 | Choi | ...................... | H04W 72/21 |
| 2019/0044667 A1 | 2/2019 | Guo et al. | | |
| 2020/0100161 A1* | 3/2020 | Awada | .................. | H04W 36/18 |
| 2021/0321267 A1* | 10/2021 | Kim | ...................... | H04W 76/28 |

OTHER PUBLICATIONS

International Search Report and Written Opinion in International Appln. No. PCT/KR2020/008807, dated Oct. 21, 2020, 17 pages (with English translation).

Vivo, "Discussion on mode 1 resource allocation mechanism," R1-1906138, Presented at 3GPP TSG RAN WG1 #97, Reno, USA, May 13-17, 2019, 13 pages.

\* cited by examiner (a)

(b)

(a)

(b)

METHOD FOR TRANSMITTING DATA BY MEANS OF TERMINAL IN WIRELESS COMMUNICATION SYSTEM SUPPORTING SIDELINK, AND DEVICE THEREFOR

CROSS-REFERENCE TO RELATED APPLICATIONS

This application is a National Stage application under 35 U.S.C. § 371 of International Application No. PCT/KR2020/008807, filed on Jul. 6, 2020, which claims the benefit of Korean Application No. 10-2019-0080641, filed on Jul. 4, 2019. The disclosures of the prior applications are incorporated by reference in their entirety.

TECHNICAL FIELD

The present disclosure relates to a method of transmitting data by a User equipment (UE) in a mobile communication system supportive of sidelink and apparatus therefor, and more particularly, to a method of processing transmission/reception of existing data based on receiving a request related to a beak search and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Task

One technical task of the present disclosure is to provide a method and apparatus for quickly forming a new link requiring a relatively high priority and a tight delay requirement by determining whether to stop transmission of existing data depending on a delay requirement, a link quality and/or a priority in case of receiving a request for a beam search from another UE during a transmission of data in an already-established link on a mmWave band and effectively performing a retransmission of the transmission stopped existing data.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

In one technical aspect of the present disclosure, provided is a method of transmitting data by a first User Equipment (UE) in a wireless communication system, the method including transmitting a first data to a second UE over a first link, receiving a first message requesting a beam search, and transmitting a second data over a second link formed based on the first message, wherein the first UE may transmit a third data corresponding to retransmission of the first data after completion of the transmission of the second data based on stopping the transmission of the first data for formation of the second link and wherein the third data may be transmitted in a manner that a second Redundancy Version (RV) different from a first RV set for the first data is set for the third data.

Information on the second RV may include information indicating that the third data is the retransmission of the first data.

The third data may further include information on an indicator or counter indicating the retransmission of the first data.

The third data may include whole data of the first data or the rest of the first data except the first data transmitted already only based on a latency requirement related to the first data.

If a quality of the first link is smaller than a first reference threshold, the first UE may stop the transmission of the first data and perform a beam search related to the second link.

The first reference threshold may be preset to a threshold related to Block Error Rate (BLER) declaring BEAM FAILURE INSTANCE (BFI) or a value higher than a threshold for RSRP (Reference Signal Received Power), SNR (Signal-to-Noise Ratio) or SINR (Signal to Interference plus Noise Ratio) corresponding to the threshold related to the BLER.

The first message may contain information on at least one of a priority and latency requirement for the second data.

If the priority related to the second data is higher than a priority related to the first data or the latency requirement related to the second data is tighter than a latency requirement related to the first data or a remaining latency budget, the first UE may stop the transmission of the first data and then perform the beam search related to the second link.

If the first message is received on Physical Sidelink Feedback Channel (PSFCH) related to feedback of the first data from the second UE, the first UE may immediately stop the transmission of the first data.

The first message may further include at least one information selected from a first start point of the beam search for formation of the second link, a start direction of the beam search and an execution direction of the beam search.

If a start point corresponding to a first start point included in the first message does not exist among a plurality of start points included in preconfigured timing information acquired based on an ID of a zone having the first UE located therein, the first UE may select a start point closest to the first start point among a plurality of the start points and transmit a second message including information on the selected start point.

The first message may be received in a frequency band below 6 GHz and the first data and the second data may be transmitted or received in a frequency band above 6 GHz.

In another technical aspect of the present disclosure, provided is a first User Equipment (UE) transmitting data in a wireless communication system supportive of a sidelink, the first UE including a Radio Frequency (RF) transceiver and a processor connected to the RF transceiver, the processor controlling the RF transceiver to transmit a first data to a second UE over a first link, receive a first message requesting a beam search, and transmit a second data over a second link formed based on the first message, wherein the processor may transmit a third data corresponding to retransmission of the first data after completion of the transmission of the second data based on stopping the transmission of the first data for formation of the second link and wherein the third data may be transmitted in a manner that a second RV different from a first RV set for the first data is set for the third data.

In another technical aspect of the present disclosure, provided is a chipset transmitting data in a wireless communication system supportive of a sidelink, the chipset including at least one processor and at least one memory operatively connected to the at least one processor and enabling the at least one processor to perform an operation when executed, the operation including transmitting a first data to a second UE over a first link, receiving a first message requesting a beam search, transmitting a second data over a second link formed based on the first message, and transmitting a third data corresponding to retransmission of the first data after completion of the transmission of the second data based on stopping the transmission of the first data for formation of the second link, wherein the third data may be transmitted in a manner that a second RV different from a first RV set for the first data is set for the third data.

The processor may control a driving mode of a device connected to the chipset based on the third data.

In another technical aspect of the present disclosure, provided is a method of receiving data by a second User Equipment (UE) in a wireless communication system supportive of a sidelink, the method including receiving a first data from a first UE over a first link, receiving a first message requesting a beam search, and receiving a second data over a second link formed based on the first message, wherein the second UE may request retransmission of a third data corresponding to retransmission of the first data after completion of the transmission of the second data based on stopping the reception of the first data for formation of the second link and wherein the third data may be received in a manner that a second Redundancy Version (RV) different from a first RV set for the first data is set for the third data.

In further technical aspect of the present disclosure, provided is a second User Equipment (UE) receiving data in a wireless communication system supportive of a sidelink, the second UE including a Radio Frequency (RF) transceiver and a processor connected to the RF transceiver, the processor controlling the RF transceiver to receive a first data from a first UE over a first link, receive a first message requesting a beam search, and receive a second data over a second link formed based on the first message, wherein the processor may request retransmission of a third data corresponding to retransmission of the first data after completion of the transmission of the second data based on stopping the reception of the first data for formation of the second link and wherein the third data may be received in a manner that a second RV different from a first RV set for the first data is set for the third data.

Advantageous Effects

According to various embodiments, a new link requiring a relatively high priority and a tight delay requirement can be quickly established by determining whether to stop transmission of existing data depending on a delay requirement, a link quality and/or a priority in case of receiving a request for a beam search from another UE during a transmission of data in an already-established link on a mmWave band and a retransmission of the transmission stopped existing data can be performed effectively.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR DISCLOSURE

Figure 1:
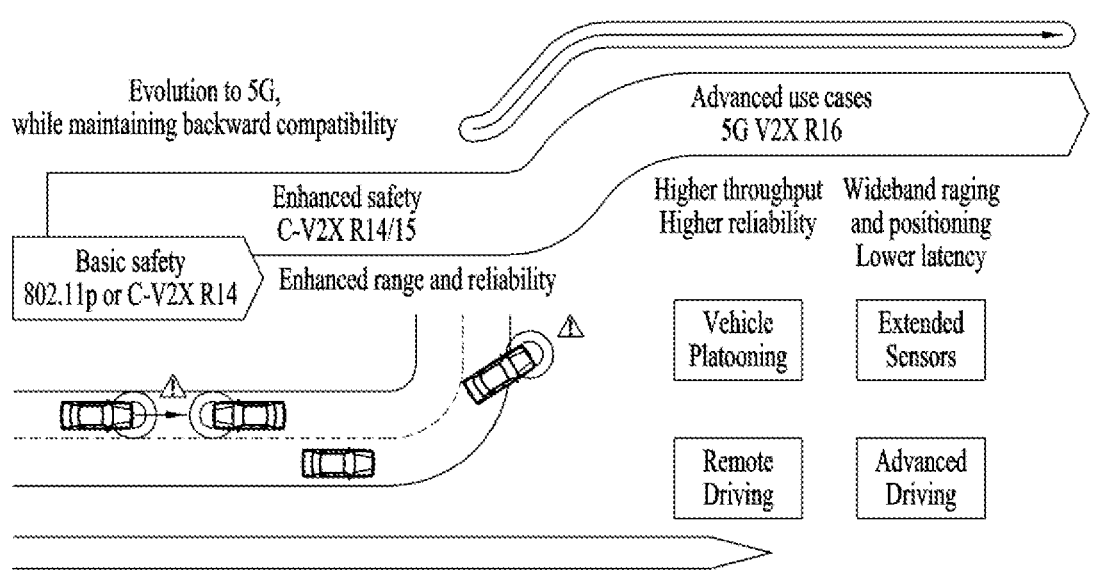
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
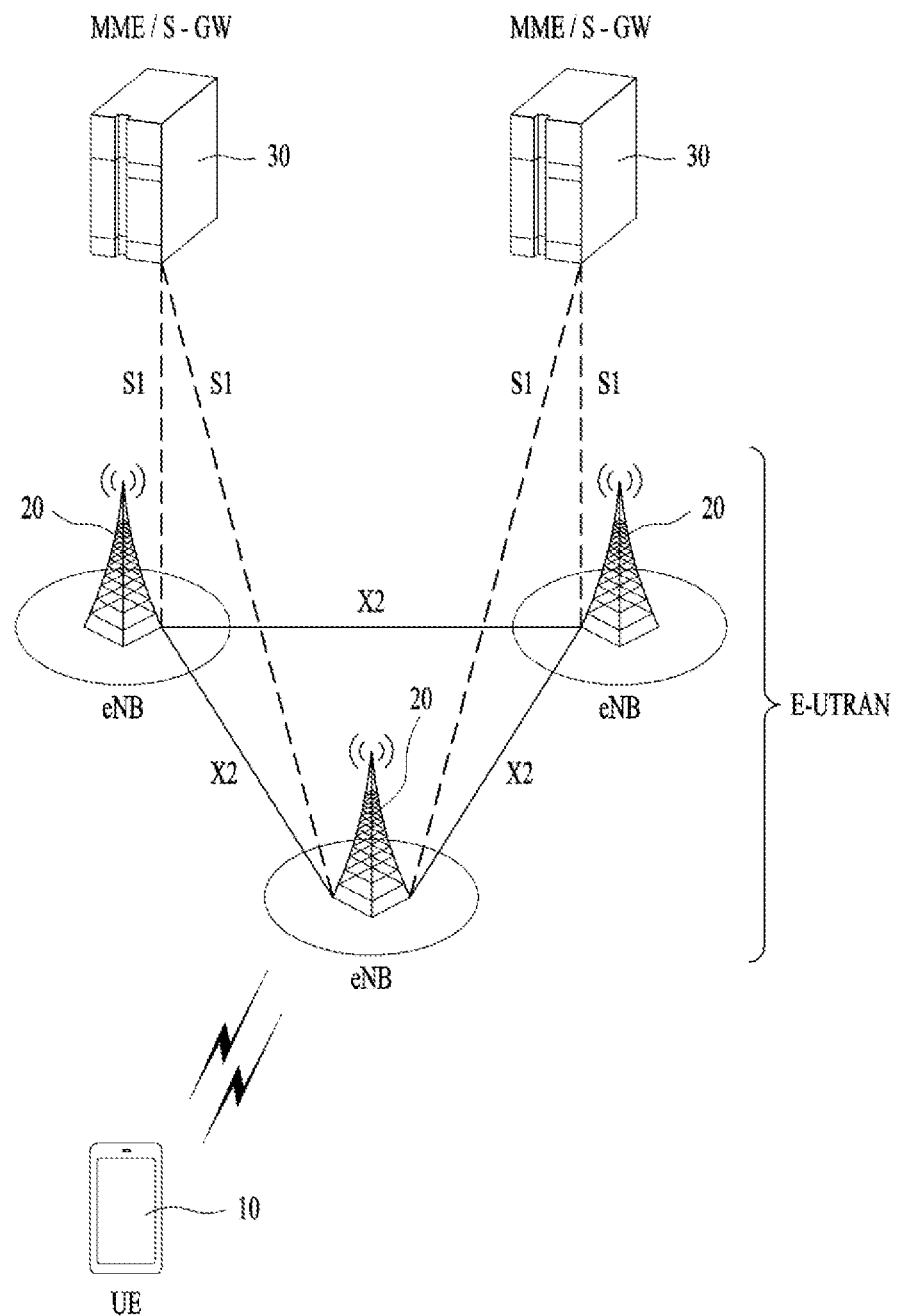
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
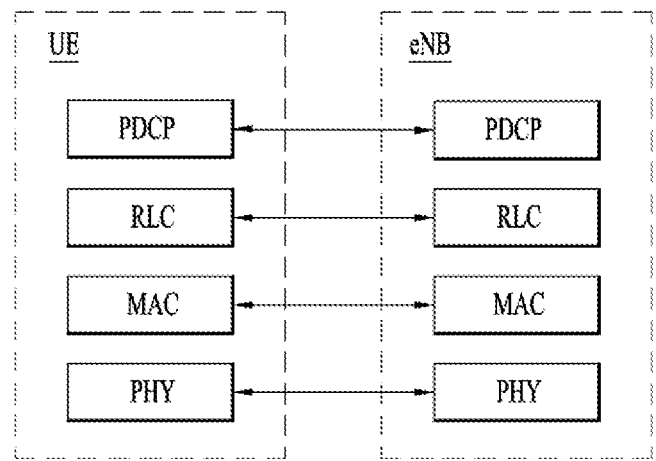
FIG. 3 illustrates a user-plane radio protocol architecture to which embodiment(s) are applicable.

FIG. 3 illustrates a user-plane radio protocol architecture to which the present disclosure is applicable.

Figure 4:
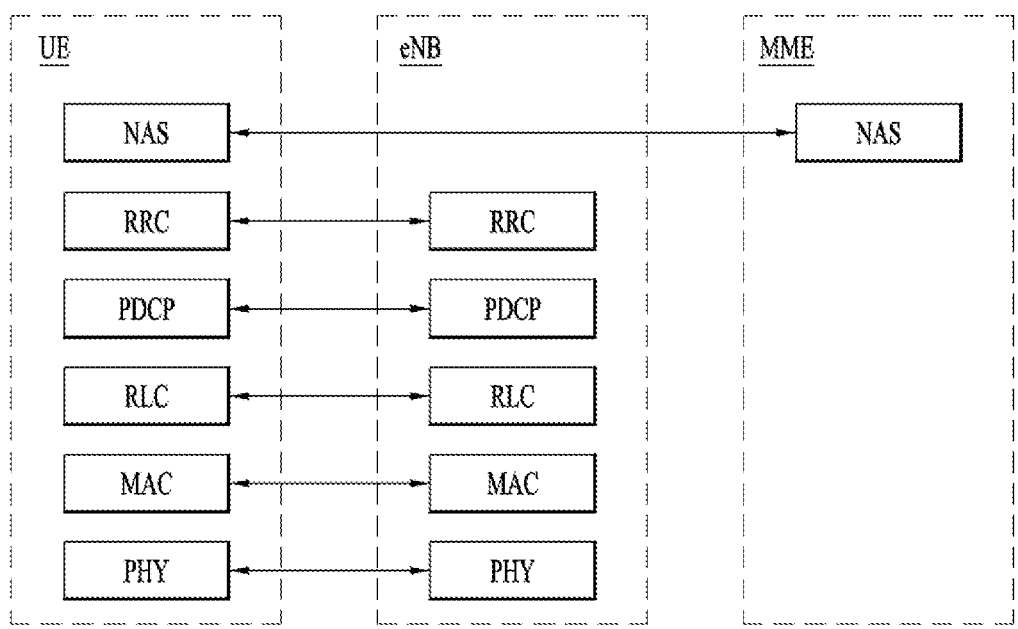
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC INACTIVE state is additionally defined. A UE in the RRC INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
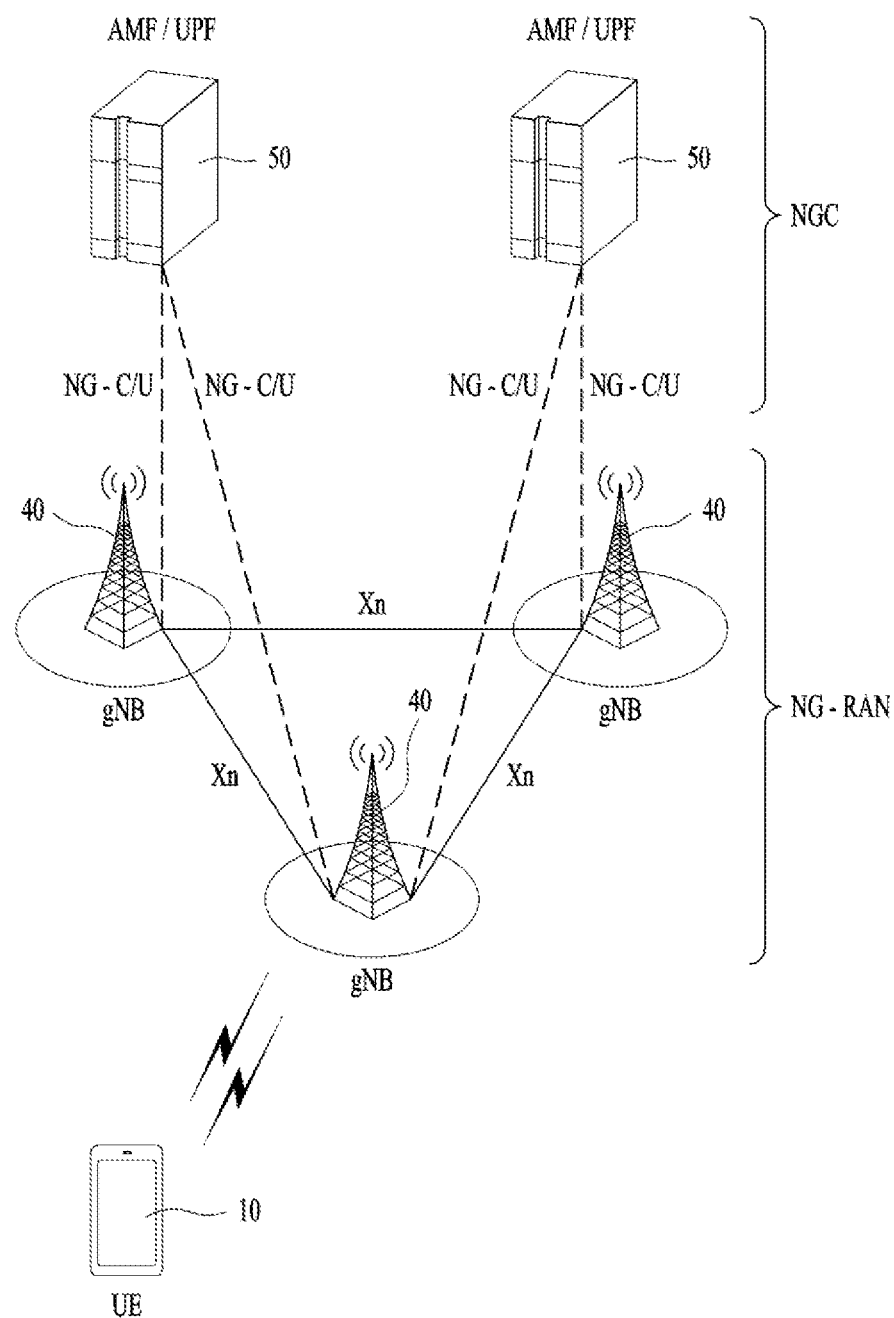
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
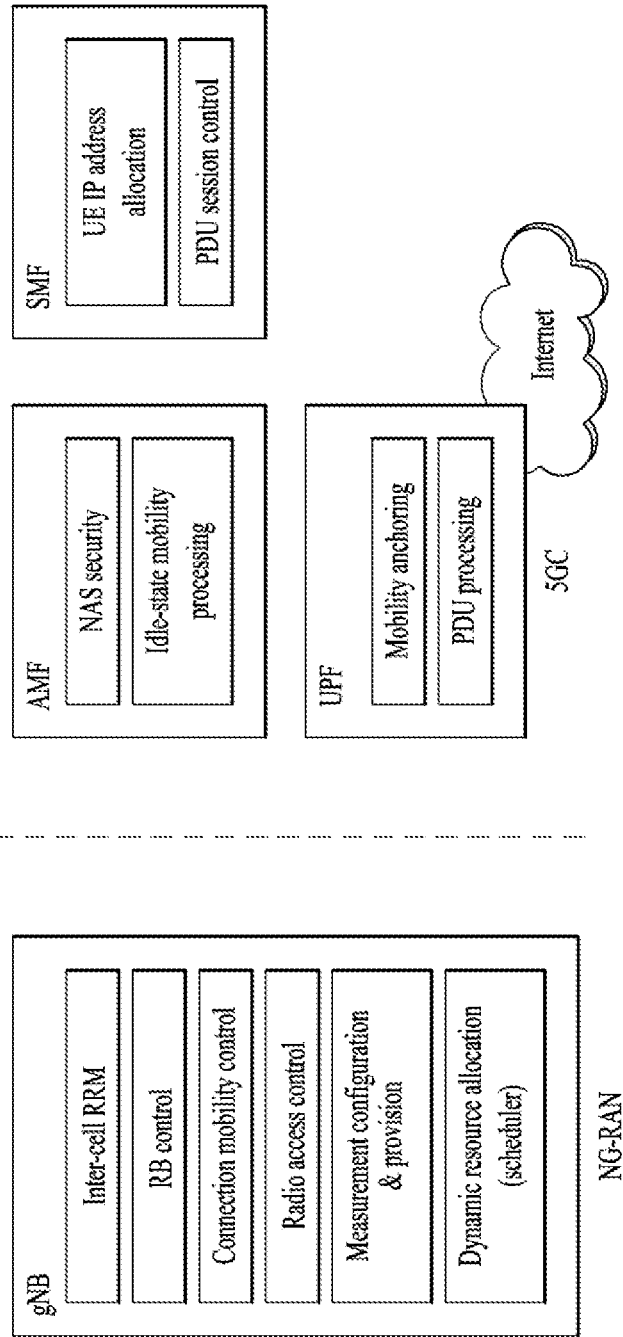
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
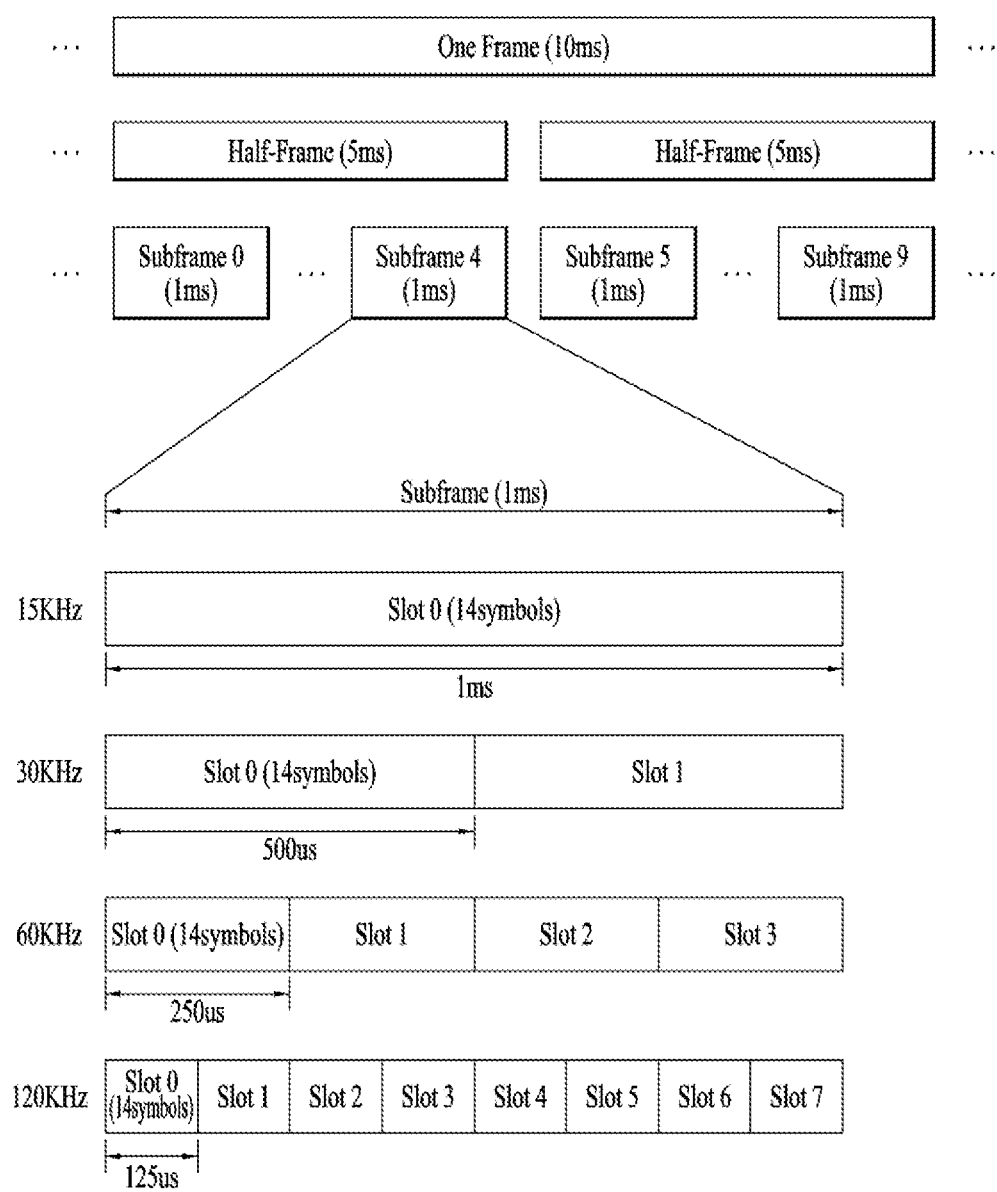
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
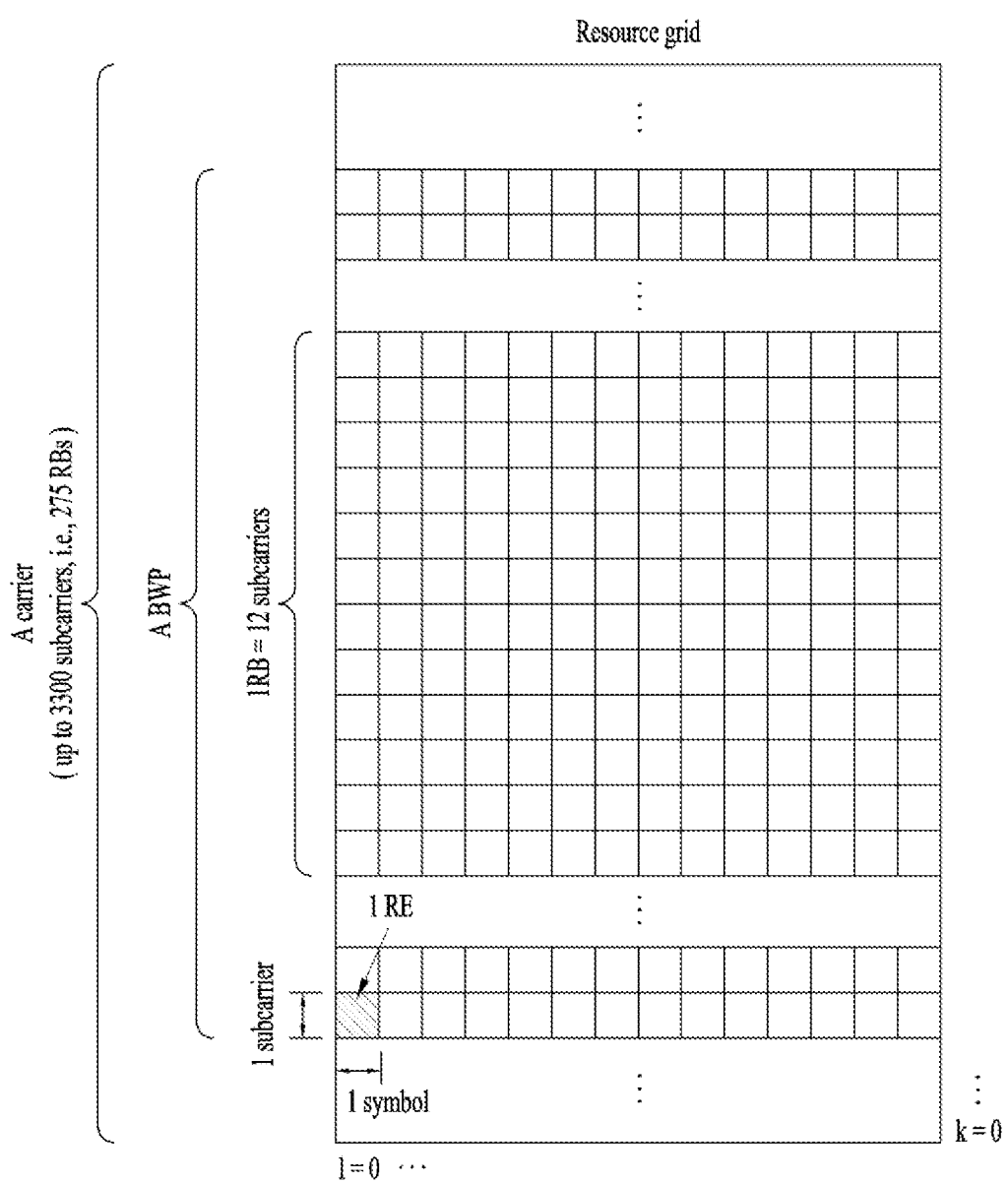
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
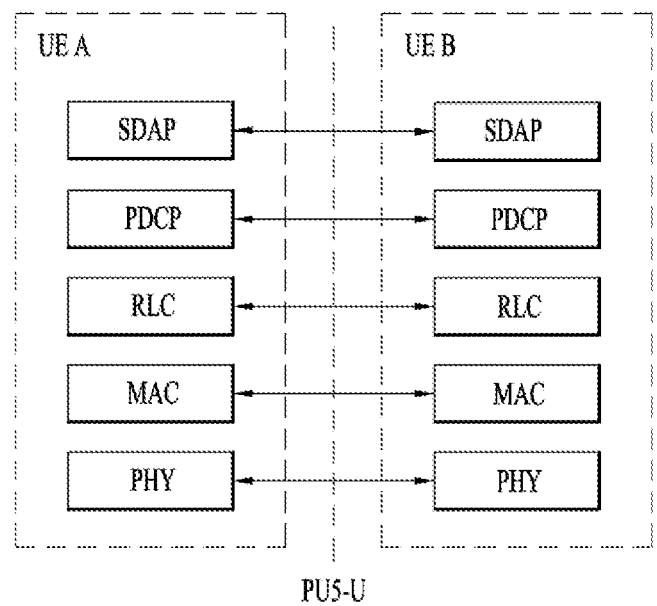
FIG. 9 illustrates a radio protocol architecture for SL communication.
Figure 9:
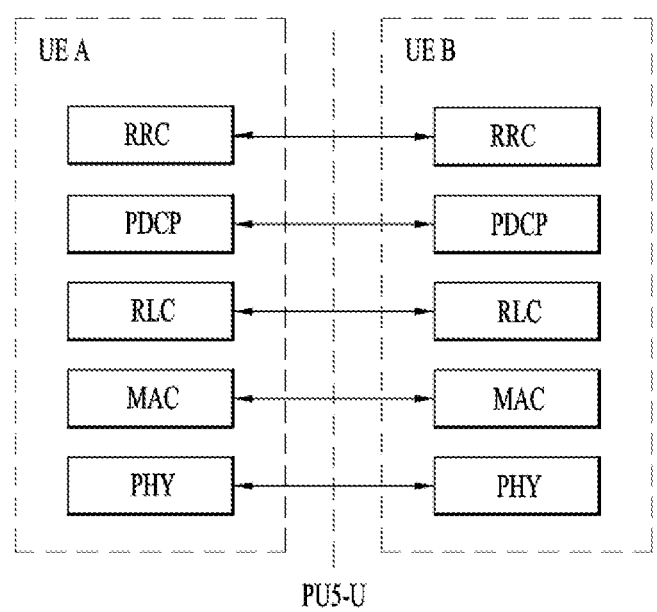

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
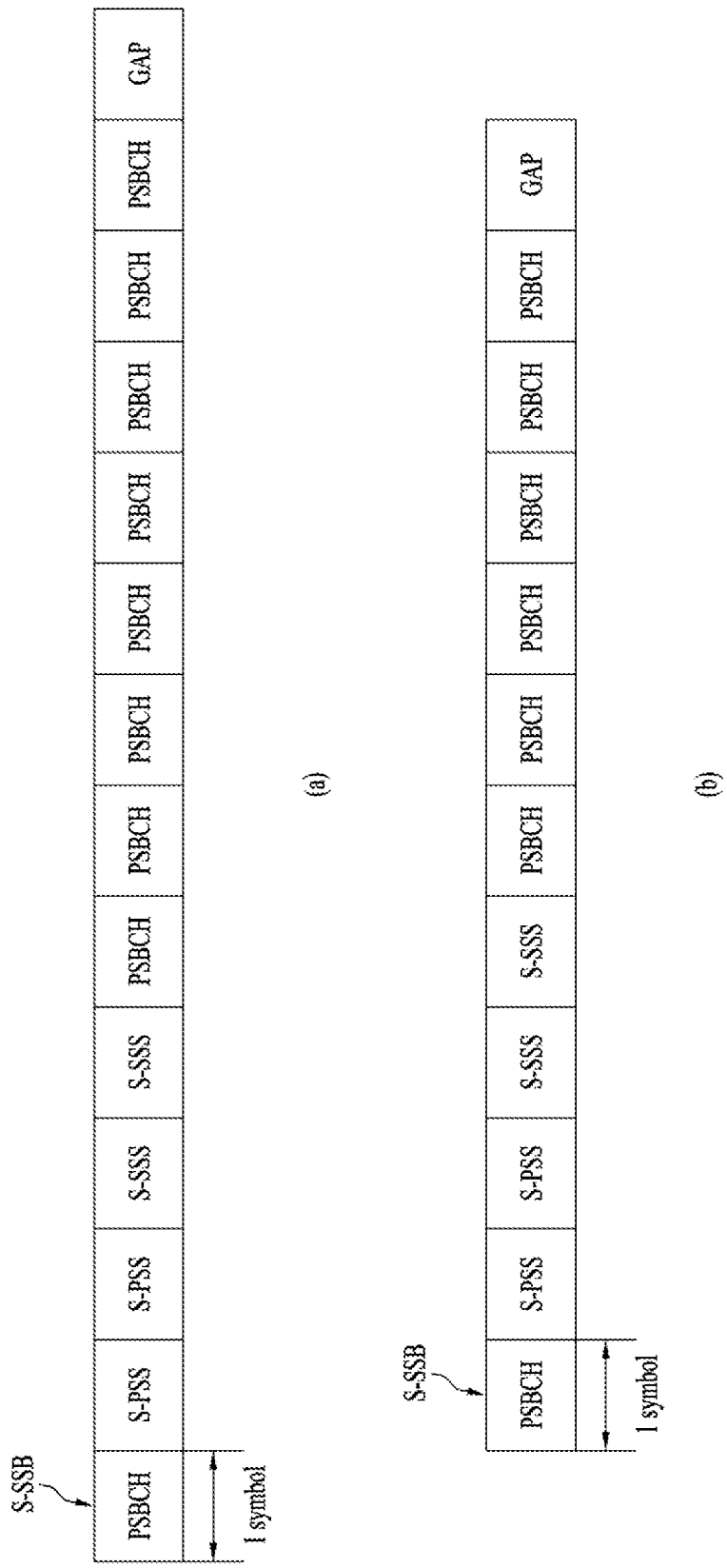
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
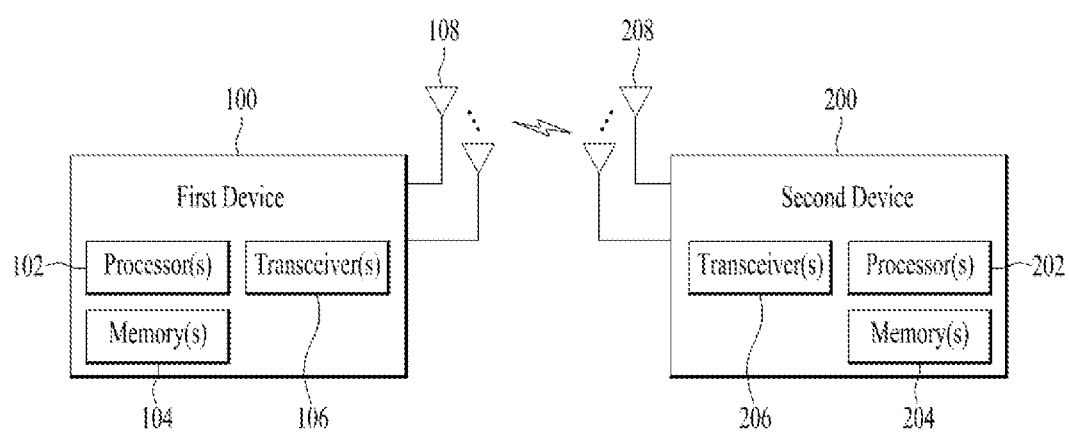
FIG. 20 illustrates wireless devices applicable to the present invention.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
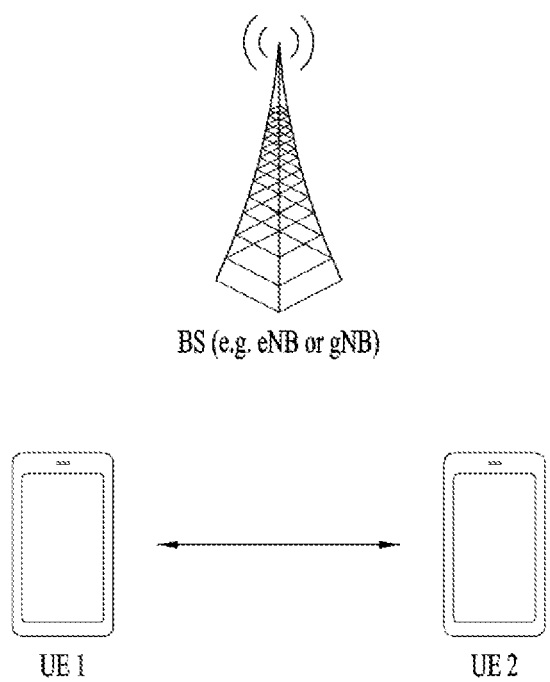
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
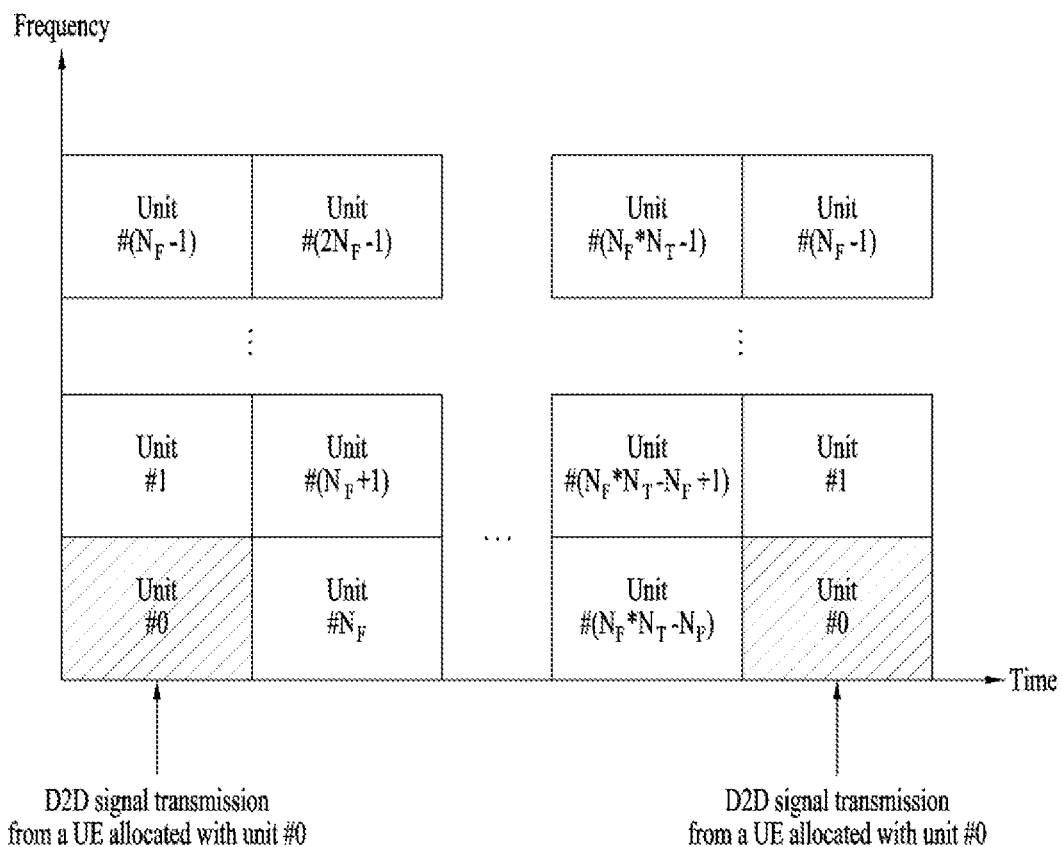
FIG. 12 illustrates resource units for V2X or SL communication.

FIG. 12 illustrates resource units for V2X or SL communication.

Referring to FIG. 12, the frequency resources of a resource pool may be divided into NF sets, and the time resources of the resource pool may be divided into NT sets. Accordingly, a total of NF*NT resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
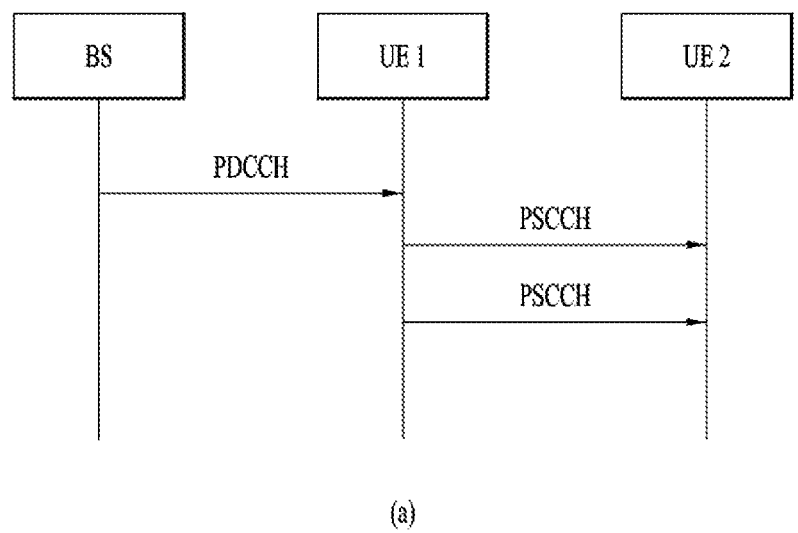
FIG. 13 illustrates a procedure in which UEs perform V2X or SL communication according to a transmission mode.
Figure 13:
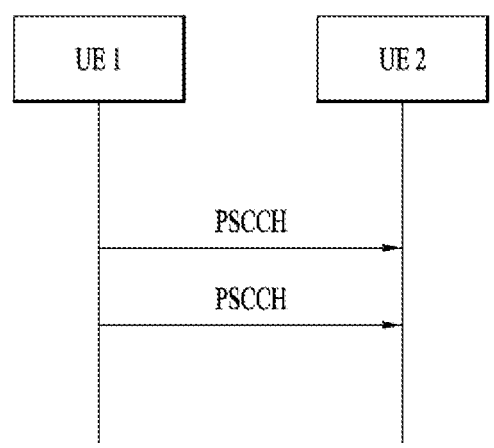

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 13-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 13-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
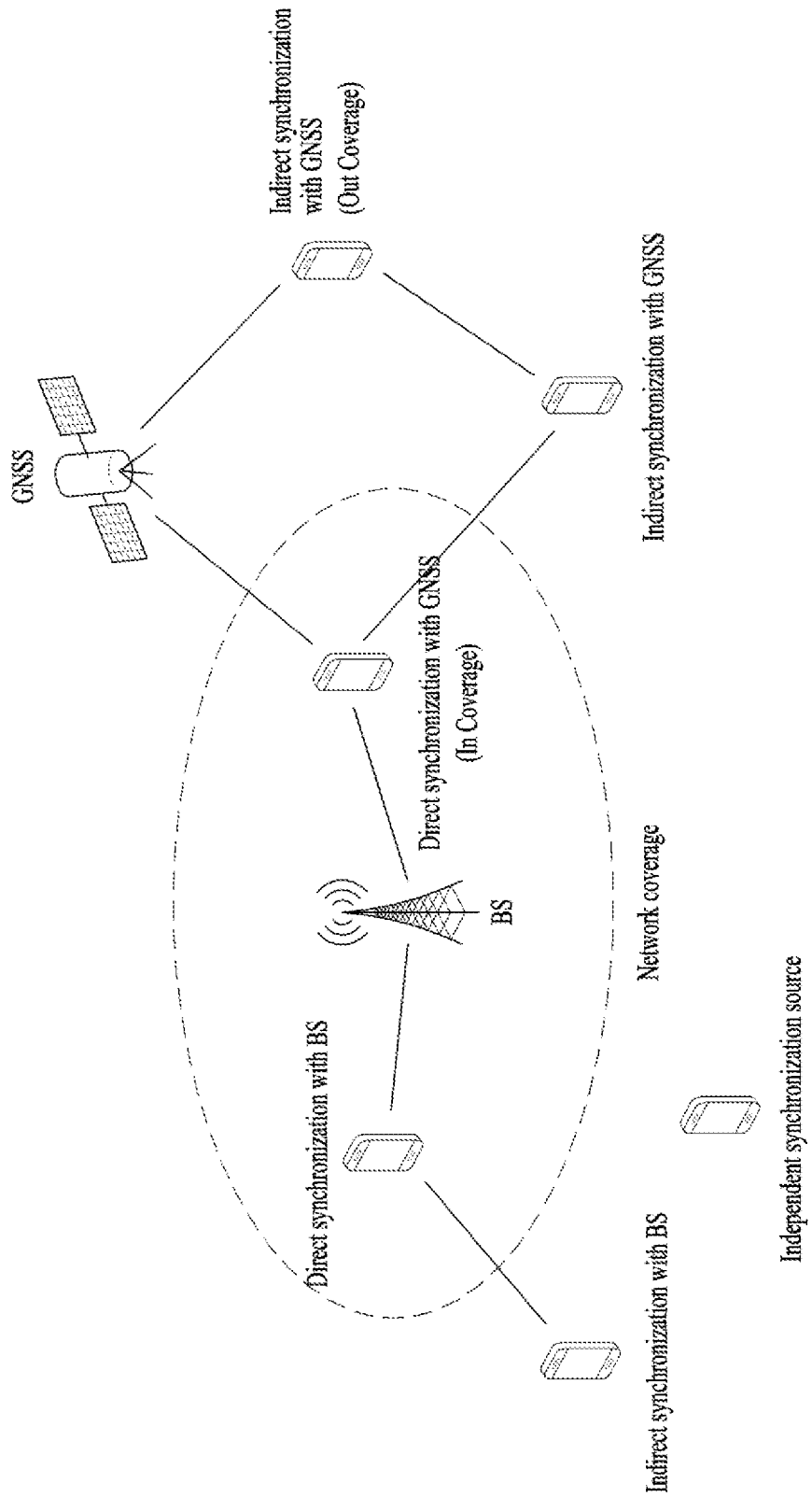
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not acquired synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Analog Beamforming and Beam Management

In case of an NR system, a massive Multi Input Multi Output (MIMO) environment in which the number of Tx/Rx antennas increases massively may be taken into consideration. As the massive MIMO environment is considered, the number of Tx/Rx antennas may increase over tens or hundreds. Meanwhile, the NR system supports communication on above 6 GHz band, i.e., millimeter frequency band. Yet, since the millimeter frequency band uses a very high frequency band, it has the frequency characteristic that signal attenuation according to a distance appears very rapidly. Hence, to compensate the rapid propagation attenuation characteristic, the NR system using at least 6-GHz band uses a beamforming scheme of performing signal transmission in a manner of focusing energy not in omni-direction but in a specific direction.

Specifically, in case that many antennas are required as is the case of a millimeter frequency band, using analog beamforming or hybrid beamforming is considered. According to analog beamforming, a multitude of antenna elements are mapped to one TXRU (transceiver unit) and a direction of beam is controlled by an analog phase shifter.

Meanwhile, to maximize a performance gain of massive MIMO, each antenna element may have a TXRU to adjust a Tx power and phase. According to this, independent beamforming per frequency resource may be enabled. However, it is very difficult to actually install a TXRU at each antenna element.

Therefore, NR is considering a method of controlling a direction of a beam using an analog phase shifter by mapping a multitude of antenna elements to a single TXRU. However, in case of an analog beam, there are a limitation in that a single beam direction can be formed per time instance (e.g., symbol, subframe) and a disadvantage in that severe performance degradation may occur in case of inaccurate Tx-Rx beam pairing.

Figure 15:
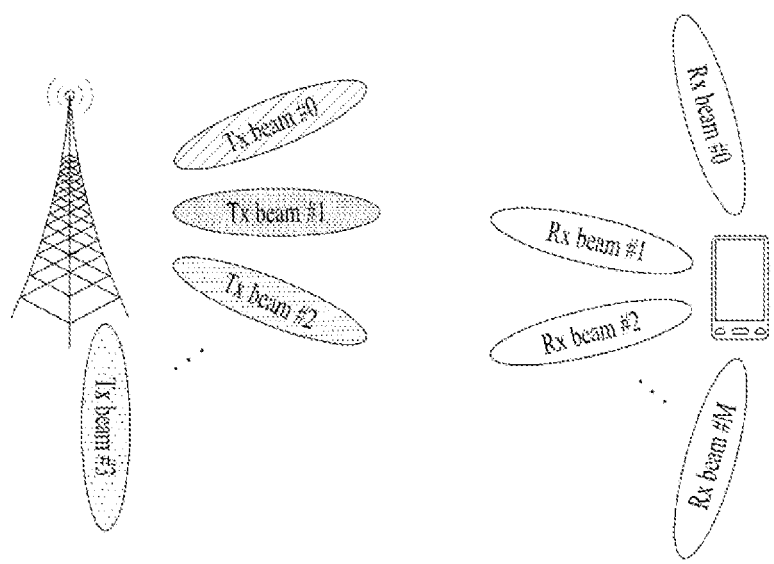
FIG. 15 is a diagram to describe a Tx-Rx beam pair configuration between a BS (e.g., eNB, gNB) and a UE.

FIG. 15 is a diagram to describe a Tx-Rx beam pair configuration between a BS (e.g., eNB, gNB) and a UE.

Referring to FIG. 15, assume that a BS and a UE configure N Tx (analog) beams and M Rx (analog) beams, respectively. In this case, when the UE receives a signal with a beam pair configured with Tx beam #1 and Rx beam #1 and a beam pair configured with Tx beam #2 and Rx beam #2, reception performance may be optimized. Yet, when a signal is transmitted on Tx beam #2, reception performance of the UE may be degraded on the rest of Rx beams except the Rx beam #2 that belongs to the corresponding beam pair.

Beam Sweeping for Vehicle Communication

The present disclosure proposes a Tx/Rx beam sweeping method when a UE is performing data transmission/reception with another UE forming a beam pair or receives an initial beam search request for Tx/Rx beam acquisition from another UE. For clarity of the description, a proposed method is described in the following on the assumption of a unicast scenario, and the method proposed in the present disclosure is similarly applicable to a multicast/groupcast/broadcast scenario. In addition, although the proposed technology is described on the assumption of a V2V scenario, the proposed technology is non-limited by the present disclosure and is similarly applicable to network-to UE communication. The proposed methods may be implemented independently, or in form of combination (or mergence) of some of the proposed methods.

In addition, a UE may form a single or plurality of beams at a specific timing. In this case, the UE may consider having a plurality of distributed antenna panels and perform transmission/reception of the same or different information using a single or plurality of antenna panels at a specific timing. A frequency band below 6 GHz and a frequency band above 6 GHz may be Time Division Multiplexed (TDMed) or Frequency Division Multiplexed (FDMed) with each other. Hence, the UE may perform specific data transmission/reception in the frequency band below 6 GHz and also perform another data transmission/reception in the frequency band above 6 GHz at the same time.

First of all, a UE's request (or triggering) message to perform the new Tx/Rx beam acquisition may be transmitted in a frequency band below 6 GHz due to the coverage issue and the difficulty in determining a beamforming direction for the message itself.

A request procedure for performing the Tx/Rx beam acquisition may include a request procedure for an initial beam search (or beam acquisition) for new data transmission/reception. In addition, the request procedure for performing the Tx/Rx beam acquisition may include a procedure for requesting a new beam search due to a mismatch of a Tx/Rx beam pair in the course of performing the existing data transmission/reception. For example, if a beam reconstruction is necessary due to an occurrence of a beam connection failure or a link connection failure during the existing data transmission/reception or a beam change such as beam reselection, beam adjustment, beam refinement and the like is necessary, the UE may transmit a request message for a new beam search. In this case, the beam search procedure may include a procedure for beam sweeping execution, link measurement, reporting and the like.

For clarity of the following description, a request message for an initial beam search for new data transmission/reception is assumed as transmitted in a frequency band below 6 GHz, by which the present disclosure is non-limited. Yet, such assumption is similarly applicable to a case that a request message is transmitted on a resource other than the frequency band below 6 GHz in a different beam search procedure other than the initial beam search. For example, as described above, the different beam search procedure may mean a beam search procedure for beam reconstruction in case of the occurrence of the beam connection failure or the link connection failure, or a beam search procedure for a beam change in case that beam reselection, beam adjustment, beam refinement and the like are demanded. Moreover, for example, the request message transmitted resource may be determined based on a specific carrier, bandwidth path, resource pool, channel, etc. In this case, the request message transmitted resource may include a band below or above 6 GHz, and a resource having less probability of occurrence of a coverage issue and an issue of beamforming direction determination may be selected.

Meanwhile, in case that a UE performs beam sweeping, transmission/reception of data is impossible in a frequency band having the beam sweeping performed therein during the beam sweeping. For example, if a UE performs beam sweeping in a mmWave Band above 6 GHz, it is impossible for the UE to perform transmission/reception of control information and/or data over the corresponding mmWave band. Hence, when a UE receives a request message for an initial beam search, it is necessary to determine an actual start timing (or interval, start point, duration) of beam sweeping in consideration of transmission/reception of control information and/or data. For example, such determination may need to be made as follows. First of all, although a request message is received, some or all UEs are restricted to perform beam sweeping at an appointed specific timing only, or a UE is allowed to perform beam sweeping at a pre-appointed or signaled specific time (x msec) after a request message reception irrespective of a previous operation.

In addition, a determination for a direction (or pattern) of beam sweeping may be necessary. Here, the direction of the beam sweeping may mean a start direction of beam sweeping, an execution direction of beam sweeping, or both of the start direction and the execution direction. For example, the following determinations may need to be made. First of all, although a request message is received, some or all UEs are restricted to start beam sweeping based on a specific start direction of beam sweeping, perform beam sweeping a specific execution direction of beam sweeping, or perform beam sweeping in consideration of both of the specific start direction and the specific execution direction.

A start direction of beam sweeping may include a start direction indicated with reference to a bearing such as east, west, south or north from a predetermined reference point. An execution direction of beam sweeping may include an execution direction such as a clockwise or counterclockwise direction from a predetermined reference point. The start or execution direction of the beam sweeping may be indicated with reference to an absolute direction. In this case, the predetermined reference point may include a preset reference point. For example, a reference point taking a 12 o'clock direction as 0' is set in advance, and a start point such as 90', 180', 270' and the like or an execution direction such as a clockwise direction, a counterclockwise direction and the like may be indicated based on the reference point. Alternatively, a start or execution direction of beam sweeping may be indicated with reference to a relative direction. In this case, a direction of a beam previously used by a UE or the like may be set as the predetermined reference point. A start or execution direction of beam sweeping is non-limited by the above example, and various indications representing directions of start or execution may be used.

Therefore, with regard to a request message of an initial beam search, addition information on a timing and direction for performing beam sweeping may be necessary, which will be described in detail later.

Figure 16:
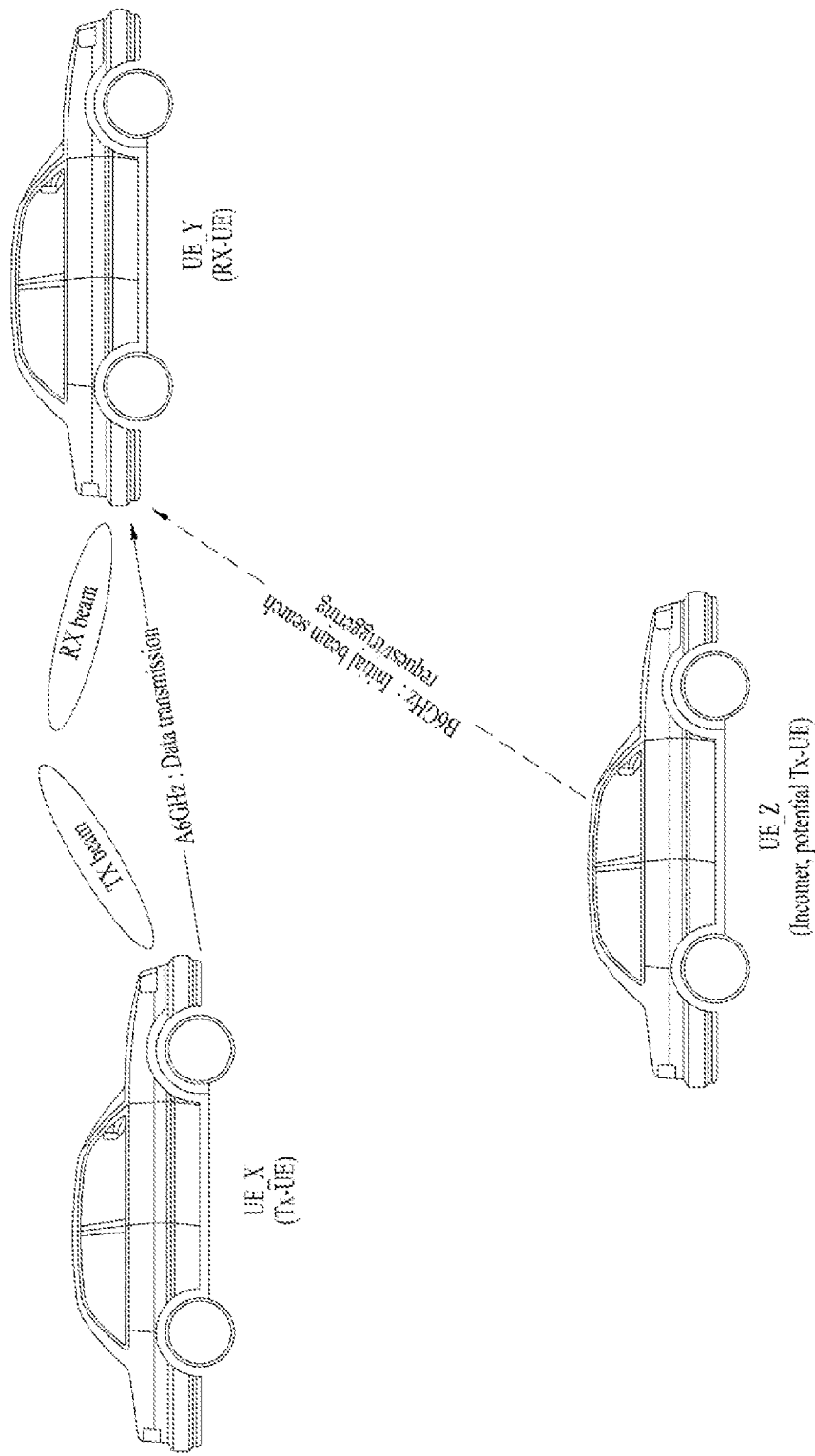
FIG. 16 and FIG. 17 are diagrams to describe an embodiment that a UE receives a request message of an initial beam search for Tx/Rx beam acquisition.
Figure 17:
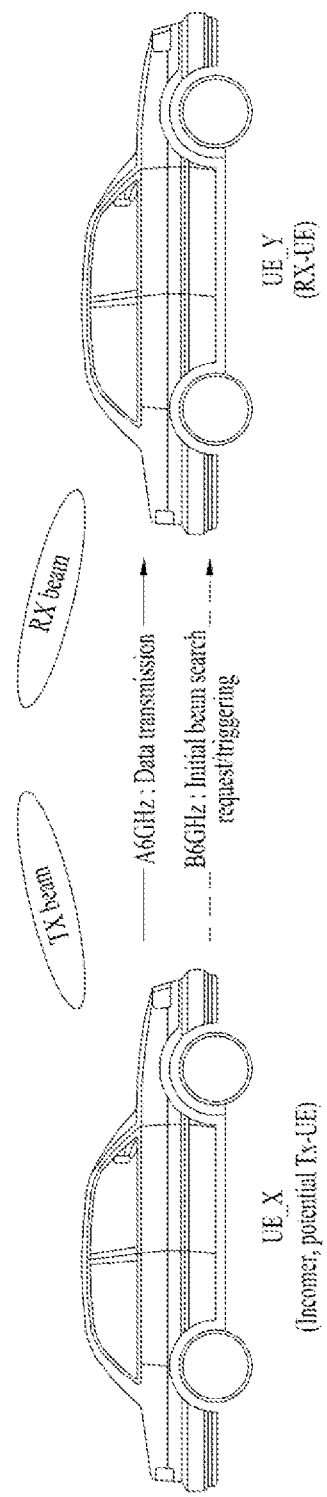

FIG. 16 and FIG. 17 are diagrams to describe an embodiment that a UE receives a request message of an initial beam search for Tx/Rx beam acquisition.

Referring to FIG. 16, a Rx UE UE_Y may receive a request message of an initial beam search for Tx/Rx beam acquisition from another Tx UE UE_Z while transceiving control information and/or data in a link formed via a beam pair with a Tx UE UE_X.

Specifically, the Rx UE UE_Y forms a link in a mmWave band by finding a Tx/Rx beam pair with one Tx UE UE_X and may then transceive control information and/or data in the formed link. While transceiving control information and/or data with one Tx UE UE_X, the Rx UE UE_Y may receive a request message of an initial beam search for Tx/Rx beam acquisition with another potential Tx UE UE_Z over signaling in a frequency band below 6 GHz.

Namely, while transceiving data with a counter UE, the Rx UE UE_Y receives an initial beam search request message for performing potential data transmission/reception from the Tx UE UE_Z different from the current counter terminal. So to speak, while transceiving data with a specific Tx UE, the Rx UE UE_Y may receive a request message of a beam search to perform potential data transmission/reception not with the current counter UE but with a new Tx UE. In this case, from the perspective of the Rx UE UE_Y, data currently transceived or data to be transceived with each Tx UE may include the same or different data.

Referring to FIG. 17, while transceiving data with a counter UE, a Rx UE UE_Y may receive a beam search request message for performing potential data transmission/reception from a Tx UE_X which is the same as the current counter UE. So to speak, while the Rx UE UE_Y transceives data after forming a link in a mmWave band by finding a Tx/Rx beam pair with one Tx UE UE_X, it may receive a request message of an initial beam search for Tx/Rx beam acquisition from the UE_X. in a situation that there is a single Tx/Rx UE pair, the Rx UE UE_Y may receive a request message of a beam search for performing additional data transmission/reception other than the data previously transceived with the current counter UE.

Thus, in case of receiving the initial beam search request message shown in FIG. 16 or FIG. 17, in response to the request message, the Rx UE UE_Y should determine a start point of beam sweeping to perform an initial beam search or a start or execution direction of the beam sweeping as well as the start point and may need to determine whether to stop or end a currently performed data transmission/reception. In this case, it is necessary to discuss about what kind of reference will be used for the Rx UE UE_Y to stop or end the currently performed data transmission/reception.

Specifically, a Rx UE may start beam sweeping corresponding to the initial beam search request message based on preconfigured search timing information. Here, the search timing information may be preconfigured with a Tx UE to which a link is already formed or preconfigured based on a zone or coverage (i.e., timing information applying in common to a specific area or coverage is preconfigured).

Although a request message of an initial beam search is received, the Rx UE may perform beam sweeping based on the preconfigured search timing information that was preconfigured or signaled. Namely, a start point of the beam sweeping according to the search timing information may include a point preconfigured or signaled between Rx and Tx UEs previously performing data transmission/reception or a point preconfigured or signaled between all UEs in a specific area or coverage. In case that the search timing information includes a plurality of start points, the Rx UE may perform beam sweeping at the earlies beam sweeping start point or a start point preferred or directly determined by the Rx UE. In this case, since the beams sweeping according to the initial beam search request message is started at the point scheduled already for the beam search, data transmission/reception currently performed in the existing link formed already may not be forced to be stopped or ended.

For example, referring to FIG. 16, UE_Y may perform an operation of determining whether to select/maintain/replace a beam pair for a plurality of Tx UEs at the same timing preconfigured to match synchronization related to beam acquisition among a plurality of the Tx UEs (i.e., based on the preconfigured search timing information). For such an operation, inter-Rx/Rx UE beam sweeping time sync and pattern may be matched based on search timing information preconfigured based on a zone or coverage. In addition, the UE_Y may provide UE_Z with information on a next beam sweeping start point according to the search timing information using a response signal of an initial beam search request signal received from the UE_Z, and the UE_Z may perform beam sweeping at a6 GHz after waiting until the start point given by the UE_Y.

In some implementations, the preconfigured search timing information may be preconfigured based on a coverage or zone, or configured based on a bandwidth, a carrier or the like.

Or, the Rx UE may determine a start point of the beam sweeping by further considering an initial beam search request message received from a potential Tx UE. Namely, the Rx UE performs beam sweeping in response to the initial beam search request message based on the preconfigured search timing information and may also specify one of a plurality of start points included in the preconfigured search timing information using information included in the initial beam search request message.

Specifically, the Rx UE may receive an initial beam search request message including information on a preferred start point from the potential Tx UE. If a point corresponding to the preferred start point exists among a plurality of start points included in the preconfigured search timing information, the Rx UE may transmit a response message of acceptance to the potential Tx UE. Or, if a point corresponding to the preferred start point fails to exist among a plurality of the start points (i.e., if it is impossible to accept), the Rx UE selects at least one of a plurality of the start points and may transmit a response message including information on the selected at least one start point to the potential Tx UE. For example, the Rx UE selects an earliest start point from a plurality of the start points and may then transmit a declining message including the selected start point to the potential Tx UE.

Or, based on preconfigured direction information related to a direction in which beam sweeping will be started, the Rx UE may determine a start direction and an execution direction of the beam sweeping corresponding to the initial beam search request message. The preconfigured direction information may be already configured with a currently linked Tx UE or preconfigured based on a coverage or zone (or zone ID). Alternatively, the preconfigured direction information may be agreed in advance for UEs in a cove rage or indicated by physical/higher layer signaling. In case that the preconfigured direction information includes a plurality of start directions and/or execution directions, the Rx UE may perform beam sweeping based on a start direction and/or an execution direction preferred or directly determined by itself.

For example, the preconfigured direction information may include information on a start direction indicating a specific direction with reference to a bearing such as east, west, south or north, information on an execution direction such as a clockwise direction or a counterclockwise direction, and/or information on a beam width. Meanwhile, the start or execution direction of the beam sweeping is non-limited by the aforementioned one example, and the preconfigured direction may variously indicate a direction for start or execution in various ways and references.

Or, the Rx UE may determine an execution direction and a start direction of the beam sweeping by further considering an initial beam search request message received from a potential Tx UE. Namely, the Rx UE determines a direction of beam sweeping corresponding to the initial beam search request message based on the preconfigured direction information and may also determine a specific direction among a plurality of directions included in the preconfigured direction information using information included in the initial beam search request message.

Specifically, the Rx UE may receive an initial beam search request message including information on a preferred start direction and a preferred execution direction from a potential Tx UE. If a start direction and an execution direction corresponding to the preferred start direction and the preferred execution direction exist in a plurality of start and execution directions included in the preconfigured direction information, the Rx UE may transmit a response message of acceptance to the potential Tx UE. Or, if a start direction and an execution direction corresponding to the start direction and the execution direction preferred by the potential Tx UE fail to exist in a plurality of the start and execution directions (i.e., if it is impossible to accept), the Rx UE selects at least one start direction and at least one execution direction from a plurality of the start and execution directions and may transmit a response message including information on the selected at least one start direction and the selected at least one execution direction to the potential Tx UE.

Or, if an execution direction corresponding to the execution direction preferred by the potential Tx UE fails to exist in a plurality of the start and execution directions (i.e., despite that a start direction corresponding to the preferred start direction exists in a plurality of the start directions), the Rx UE may transmit a response message including information on one execution direction preferred among a plurality of the execution directions. In this case, the Rx UE and the potential Tx UE may perform the beam sweeping in the start direction preferred by the Tx UE and the one execution direction preferred by the Rx UE.

Or, based on the preconfigured search timing information and the direction information, the Rx UE may perform beam sweeping corresponding to the initial beam search request message with the potential Tx UE. In addition, based on the initial beam search request message and the response message, the Rx UE may specify at least one start point and at least one start direction (and/or execution direction) in the preconfigured search timing information and the direction information.

Thus, in case that beam sweeping corresponding to an initial beam search request message is performed based on preconfigured search timing information and direction information, since a Rx UE forms a new beam pair based on pre-agreed or signaled beam sweeping start point information, other complicated procedure designs are unnecessary, whereby overhead can be reduced. In addition, if an execution timing (or point) of beam sweeping is newly set each time a new request message is received, it may cause a problem that beam weeping occurs very frequently per link depending on the number of request messages. Therefore, the above-described method can prevent such a problem.

Meanwhile, a potential Tx UE attempting to form a new beam pair is unable to perform data transmission/reception until a start point determined by the preconfigured search timing is reached. This is no problem if a priority of data to be transceived by the potential Tx UE is low or a latency requirement is not tight. However, if importance is high or a latency requirement is tight, the corresponding method has a disadvantage in that transmission/reception of data having high importance or tight latency requirement may be delayed.

In case that a Rx maintains a beam pair using some of a plurality of antenna panels of its own or maintains a beam pair based on some of a plurality of beam candidate groups of the Rx UE, the Rx UE may perform limited beam sweeping on a potential Tx UE using an unused antenna panel or beam candidate group. Yet, since the corresponding method allows the beam sweeping to be performed for an unused antenna panel or beam candidate group at a start point determined by the preconfigured search timing only, flexibility for beam sweeping execution operation initiation per antenna panel or beam group is not secured. Here, the unused antenna panel or beam candidate group means a currently unused antenna panel or beam candidate group, an antenna panel or beam candidate group unused for currently performed data transmission/reception, or an antenna panel or beam candidate group irrespective of current data transmission/reception despite joining a beam sweeping operation. Here, the start point determined by the preconfigured search timing information may include a start point of a next earliest beam sweeping among a plurality of start points included in the preconfigured search timing information or a start point directly determined by a UE. In addition, a point at which data transmission/reception is not performed may mean a Transmission Time Interval (TTI) in which data transmission/reception is not performed.

In consideration of this, hereinafter, a method of performing beam sweeping based on a time point at which data transmission/reception previously performed by a Rx UE in a band above 6 GHz is not performed, even before a start point determined by the preconfigured search timing is reached, will be additionally discussed.

Operation According to Reception of Initial Beam Search Request Signal

In a situation that a Rx UE transceives data with a Tx UE, as shown in FIG. 16, the Rx UE may receive an initial beam search request message for Tx/Rx beam acquisition from a potential Tx UE. Here, the initial beam search request message may include a request message of a beam search for new data transmission/reception. For clarity of the following description, the initial beam search request message may be defined as a request message (or a first message), and a message transmitted by the Rx UE in response to the initial beam search request message may be defined as a response message.

If a preset condition is met in case of receiving a request message of an initial beam search, a Rx UE may restrictively stop or end data transmission/reception performed on the basis of an already formed link and then perform beam sweeping.

For example, the Rx UE may determine whether to perform beam sweeping by comparing a priority of a service or data packet to newly transceive according to the request message with a priority of a currently transceived service or data packet. If the priority of the service or data packet to newly transceive is higher than the priority of the currently transceived service or data packet, the currently performed data transmission/reception is stopped or ended and the beam sweeping may be performed. On the contrary, if the priority of the service or data packet to newly transceive is lower than the priority of the currently transceived service or data packet, the currently performed data transmission/reception is not stopped or ended and the beam sweeping may be performed at a start timing determined based on the above-described preconfigured search timing information.

In this case, the request message may contain information on ProSe Per-Packet Priority PPPP) of a service or data packet a potential Tx UE intends to transmit. The Rx UE may determine whether to perform a priority-based limited beam sweeping based on the information on the PPPP contained in the request message. Here, the information on the PPPP may be one of informations to deliver information on a priority to the Rx UE. Or, PPPP information of service or data packets currently transceived or scheduled to be transmitted by the potential Tx UE may be signaled in advance to each UE in a previous discovery procedure between the respective UEs or a previous unicast/multicast setup procedure.

Or, although the Rx UE starts beam sweeping corresponding to the request message at an earliest beam sweeping start point among a plurality of start points included in the preconfigured search timing information, it may happen that the Rx UE is unable to meet the latency requirement for a service or data packet to be newly transceived according to the request message. In this case, the Rx UE may stop or end the currently performed data transmission/reception in consideration of importance of the latency requirement and perform beam sweeping newly. In this case, the request message may contain information on the latency requirement of the service or data packet to be newly transceived. Or, information on the latency requirement of a service or data packets scheduled to be transceived by the potential Tx UE may be signaled in advance to the Rx UE and the potential Tx UE in a previous discovery procedure between the Rx UE and the potential Tx UE or a previous unicast/multicast setup procedure. Here, the information on the latency requirement may be transmitted together with the aforementioned PPPP information.

Or, the Rx UE measures a link quality of a beam pair formed for the currently performed data transmission/reception. If the equality measurement value is agreed in advance or smaller than a signaled specific threshold (or a first reference threshold), the Rx UE stops or ends the currently performed data transmission/reception and may perform beam sweeping for a plurality of Tx UEs. Or, it is expected that a link quality of a beam pair formed for the currently performed data transmission/reception will become poorer, the Rx UE stops or ends the currently performed data transmission/reception and may perform beam sweeping on a plurality of Tx UEs. In doing so, the measurement of the link quality may be performed based on Reference Signal Measurement Power (RSRP) or Signal-to-Noise Ratio (SNR).

As described above, if the request message is received and the preset condition is met, the Tx or the Rx UE may stop transmission/reception for the first packet via a previously formed link and perform beam sweeping to form a new link (or a new beam pair). In addition, the Tx or Rx UE may perform a transmission of the second packet over a beam pair formed by performing the beam sweeping.

In this case, a subsequent operation according to the reception of the request message may differ depending on whether a UE having received the request message is the Tx UE or the Rx UE, and an operation in the Rx UE and a detailed operation in the Tx UE will be described as follows.

Specifically, while a Tx UE, i.e., a UE_X is performing a transmission of a first packet P_1 to Rx UE(s), i.e., UE_Y(s) by unicast or multicast, the UE_X and/or the UE_Y(s) may need to perform transmission/reception of another packet, i.e., a second packet P_2. Or, while a Tx UE, i.e., a UE_X is performing a transmission of a first packet P_1 to Rx UE(s), i.e., UE_Y(s) by unicast or multicast, the UE_X and/or the UE_Y(s) may need to transceive the request message to find a beam pair necessary for transmission/reception of the second packet P_2. It may happen that such a message making a request for beam sweeping as the request message should be transmitted/received. Specifically, the following situation may occur.

First of all, the Tx UE transmitting the first packet may form a new link with the Rx UE or a potential UE in a situation such as a first case and/or a second case as follows.

The first case includes a case of packet transmission-transmission collision. While the UE_X transmits the first packet P_1 to the UE_Y(s), it may unexpectedly happen that transmission of the second packet P_2 to the UE_Y(s) or the UE_Z is necessary.

The second case includes a case of packet transmission-reception collision. While the UE_X transmits the first packet P_1 to the UE_Y(s), it may unexpectedly happen that reception of the second packet P_2 from the UE_Z is necessary.

Or, the Rx UE receiving the first packet may form a new link with the Tx UE or a potential UE in a situation such as a third case and/or a fourth case as follows.

Specifically, the third case includes a case of packet reception-transmission collision. While the UE_Y receives the first packet P_1, it may unexpectedly happen that transmission of the second packet P_2 to the UE_X or the UE_Z is necessary.

The fourth case includes a case of packet reception-reception collision. While the UE_Y receives the first packet P_1 from the UE_X, it may unexpectedly happen that reception of the second packet P_2 from the UE_X or the UE_Z is necessary.

When the situation of the first or second case occurs, if the aforementioned preset condition is met, the Tx UE UE_X may stop the transmission of the first packet and perform a beam sweeping procedure for transmission or reception of the second packet. When the situation of the third or fourth case occurs, if the aforementioned preset condition is met, the Rx UE UE_Y may stop the reception of the first packet and perform a beam sweeping procedure for transmission or reception of the second packet.

Specifically, as described above, the preset condition may include at least one of a case that a priority of the first packet is lower than that of the second packet (e.g., a case that PPPP of the first packet is lower than that of the second packet), a case that a latency requirement of the second packet is tighter than that of the first packet, and a case that a link for transceiving the first packet is expected to be or become lower than the first reference threshold.

Here, the case that the latency requirement of the second packet is tighter than that of the first packet may include a case that a remaining latency budget is sufficient despite that the transmission of the second packet P_2 is prioritized or a case that the latency requirement of the second packet P_2 is not met in case of maintaining the transmission of the first packet P_1 (e.g., a case that probability of meeting the latency requirement of the second packet is low or becomes equal to or smaller than a specific threshold).

Regarding whether it is a case that a link for transceiving the first packet is expected to be or become lower than the first reference threshold, it may be determined based on a result from comparing a measurement value of RSRQ, SINR and/or the like for the link of the first packet with the specific threshold. Here, the measurement value such as RSRQ, SINR and/or the like may include a measurement value for a specific timing point, a minimum, maximum or average value among values measured in a specific time interval, or a maximum, minimum or average value of some samples among measurement values in a specific time interval. The first reference threshold may be set in advance, and more particularly, may be set to a value higher than a threshold for a beam or link failure decision on the link of the first packet. It may be a value higher than a threshold for the beam/link failure decision (e.g., the first threshold size may be preset to a size determined as not worth maintaining the link despite that a link quality is not degraded to be decided as beam failure/link failure).

If the situation of the first or second case occurs and the preset condition is met, the Tx UE may stop or end the transmission of the first packet. If the situation of the third or fourth case occurs and the preset condition is met, the Rx UE may stop or end the reception of the first packet. In doing so, the Tx or Rx UE may inform the potential UE of a start point of starting the beam sweeping in consideration of a timing of stopping the transmission/reception.

In the third case and the fourth case, if the Rx UE stops or ends the reception of the first packet, the following operation may be performed. First of all, although the Rx UE stops or ends the reception of the first packet, the transmission of the first packet from Tx UE may be maintained. Hence, the Rx UE needs to inform the Tx UE that the reception of the first packet is stopped or ended. Specifically, the Rx UE may inform the Tx UE that the reception of the first packet was stopped using a second message.

Specifically, the Rx UE may transmit a second message indicating the stop of the reception of the first packet to the Tx UE via a resource (e.g., PSFCH) of feedback or reporting configured in relation to the first packet. In this case, the message may contain information on the stop in form of a pre-agreed/signaled sequence or an X-bit indicator.

As described above, if the transmission or reception of the first packet is stopped, the Rx or Tx UE may perform an operation for beam sweeping with a potential Rx UE (or a UE corresponding to the transmission/reception of the first packet). As described above, the Rx or Tx UE may perform beam sweeping for forming a beam pair with the potential UE based on a start point, a start direction and/or an execution direction determined based on the preconfigured search timing information and/or direction information. In addition, the Rx or Tx UE may specify a specific start point at which the beam sweeping will start or a specific direction among a plurality of beam directions included in the preconfigured direction information via the request message and the response message with the potential UE. Thereafter, the Rx or Tx UE may perform transmission/reception of the second packet in a link formed according to the beam sweeping.

Meanwhile, in case that the transmission or reception of the second packet in the formed link is complete, the Tx or Rx UE may resume the stopped or ended transmission or reception of the first packet.

In the situation of the first or second case, the Tx UE may retransmit the whole first packet or transmit the rest of the first packet failing to be transmitted. In case that the Tx UE retransmits the whole first packet, the Tx UE may retransmit the first packet on a resource reselected by performing resource reselection or a resource reserved in advance. In this case, the Tx UE may retransmit the first packet by configuring a Redundancy Version (RV) different from an RV related to the first packet. Alternatively, the Tx UE may indicate the retransmission of the whole first packet in a manner of including a separate indicator or counter value in the first packet.

Or, the Tx UE may retransmit the rest of the first packet only. The Tx UE may retransmit the rest of the first packet on a resource reselected by performing resource reselection for the retransmission of the rest of the first packet or a resource reserved in advance. In this case, the Tx UE may inform the Rx UE that the retransmission of the rest of the first packet is performed in a manner of including a separate indicator or counter value in the first packet. Here, the counter value or information on a counter may include a value of a count indicating whether the transmission of the first packet is the first transmission or what numberth retransmission.

Or, the Rx UE may identify whether the retransmitted first packet is the whole retransmission or the retransmission of the rest based on whether a value for RV is changed in the retransmitted packet. For example, if the changed RV is included in the retransmitted first packet, the Rx UE may recognize that the retransmitted first packet corresponds to the whole retransmission of the first packet of which transmission was stopped. If the same RV of the previous is included in the retransmitted first packet, the Rx UE may recognize that it is the retransmission of the rest of the first packet of which transmission was stopped.

Meanwhile, the Tx UE maintains the link related to the first packet (i.e., the link according to the Tx-Rx beam pair). If the retransmission of the first packet is not valid, the Tx UE may drop the transmission of the first packet itself. For example, since a quality of a link related to the first packet is low, if the transmission of the first packet is stopped or ended, beam sweeping for forming a new link needs to be performed. As the additional beam sweeping is performed, the latency requirement of the first packet may be not met. In this case, the Tx UE may drop the transmission of the first packet.

Or, in the situation of the third or fourth case, after the reception or transmission of the second packet has been completed, the Rx UE may transmit a third message indicating the retransmission of the first packet is necessary to the Tx UE. Meanwhile, the third message may further contain separate information on a timing at which the retransmission of the first packet was performed, which corresponds to the second message. Moreover, the third message may be transmitted after a timing point at which the reception of the first packet has been stopped.

Specifically, the Rx UE may transmit the third message, which requests the retransmission of the first packet, to the Tx UE via a resource (e.g., PSFCH) of feedback or reporting configured in relation to the first packet. In this case, the third message may contain information on the retransmission request or stop in form of a pre-agreed/signaled sequence of X-bit indicator.

The above-described first to fourth cases and conditions and procedures related to subsequent operations may identically occur in or apply to the general beam pairing between Tx and Rx UEs as well as initial beam search event occurrence. Although it is described that the determinations of Rx beam and Tx resource is independently performed by a UE, the above-described methods may similarly apply to a case that a BS, a different UE (e.g., a group header UE, a header UE of platooning, etc.) or an RSU determines beam and Tx resource related to the sidelink.

According to one embodiment, as the aforementioned preset condition is met, if the transmission or reception of the first packet is stopped, a Rx UE may transmit a second message indicating that data transmission/reception in an existing link will be stopped and/or a third message containing information on a next beam sweeping start point to a Tx UE currently performing data transmission/reception. In this case, if receiving the second message and/or the third message, the Tx UE may recognize the second message and/or the third message as a sort of the above-described request message. Having received the second message and/or the third message from the Rx UE, the Tx UE may perform beam sweeping to search for a new beam pair in accordance with the next beam sweeping start point. If a beam pair is formed by performing the beam sweeping, the Rx UE and the Tx UE may continue the previously-stopped transmission of the service or first packet. Or, the Rx UE and the Tx UE may drop the previously-stopped transmission of the service or first packet and start a new transmission of the corresponding service or data packet.

For example, if receiving the third message from the Rx UE, the Tx UE may stop the transmission of the first packet until the start point contained in the third message and perform beam sweeping for retransmission of the first packet from the start point. The Tx UE forms a new beam pair with the Rx UE according to the beam sweeping and resumes the transmission of the first packet, or may perform transmission of a new packet or service by dropping the transmission of the first packet.

Or, the Tx UE may recognize the second message and/or the third message as a request message for resource reselection related to the first packet transceived previously. Here, a resource that is a target of the reselection request may include a time resource, a frequency resource, a beam or a space resource.

Performing Beam Sweeping Using a Spare Antenna Panel

The Rx UE and/or the Tx UE may include a plurality of antenna panels and form an independent beam pair by independent beam sweeping per antenna panel. In this case, a plurality of the antenna panels included in the Rx UE or the Tx UE may include spatially isolated or independent panels. For example, if the Rx UE or the Tx UE includes two antenna panels #0 and #1, the antenna panel #0 may be located on a front part and the antenna panel #1 may be located on a rear part. Or, the Rx UE and/or the Tx UE may form a plurality of beams. A plurality of the beams may be classified into a plurality of beam groups, and a transmission resource or a transmission resource group may be configured per beam group. In this case, an independent beam pair may be formed over independent beam sweeping per beam group or transmission resource group. For clarity of the following description, an independent beam pair is mainly formed per antenna panel, which is applicable to a case of forming an independent beam pair per beam group or transmission resource group.

When a Rx UE only uses an antenna panel #0 for data transmission/reception with a Tx UE, it may receive the request message from a potential UE that is a potential Tx UE. Here, as described above, the request message is a request message of a beam search for new data transmission/reception.

In this case, the Rx UE may maintain a link for the existing data transmission/reception at the antenna panel #0 and perform beam search and beam sweeping with the potential UE by targeting only the antenna panel #1 not affecting the link at the antenna panel #0. Or, if there is a beam group mapped to the currently performed data transmission/reception, it is able to attempt the beam pair forming with the potential UE by utilizing candidates of the rest of beam groups except the corresponding beam group only. The beam group mapped to the currently performed data transmission/reception may correspond to the antenna panel #0 and the rest of the beam groups except the corresponding beam group may correspond to the antenna panel #1.

Since the Rx UE searches for a beam pair by targeting a limited beam candidate set such as a limited antenna panel, a limited beam candidate and the like, it may have a link quality of the formed beam pair poorer than that of a case of searching for a beam pair by targeting all antenna panels or all beam candidates. In this case, the Rx UE may perform beam sweeping by targeting a limited beam candidate set (hereinafter, a spare antenna panel) and then determine whether to form a beam pair by measuring the link quality.

For example, if a measurement value of Reference Signal Received Power (RSRP), Signal-to-Noise Ratio (SNR) or Reference Signal Received Quality (RSRQ) for a beam pair link is equal to or greater than a second reference threshold, the Rx UE may be allowed to from a new beam pair through the spare antenna. Or, if the RSRP, SNR or RSRQ measurement value for the beam pair link is smaller than the second reference threshold, the Rx UE may be restricted from forming a new beam pair through the spare antenna panel.

Or, if the measurement value for the spare antenna panel is smaller than the second reference threshold, the Rx UE may not form an independent beam pair per antenna panel but may determine a beam sweeping start time and the like based on search timing information and direction information preconfigured according to the above-described method. Namely, the Rx UE does not form a separate link coexisting with an existing link using a spare antenna panel but may perform beam sweeping for link formation with the potential UE after the step or end of the existing link. In this case, the Rx UE may perform beam sweeping corresponding to the request message by targeting antenna panels or beam candidates entirely.

Configuration of Messages for Beam Search Request and Response

Regarding the proposed methods, a request message that is the initial beam search request message and a response message in response to the initial beam search request message may be configured as follows.

The method of transmitting the request message is non-limited by a signal or channel. For example, the request message may be transmitted on a signal or channel of all or some of a Synchronization Signal Block (SSB) including Primary Synchronization Signal (PSS), Primary Sidelink Synchronization Signal (PSSS), Secondary Synchronization Signal (SSS), Secondary Sidelink Synchronization Signal (SSSS), or Physical Sidelink Broadcast Channel (PSBCH).

Or, the request message may be transmitted as all or some of control information or feedback information on Physical Sidelink Control Channel (PSCCH) or Physical Sidelink Feedback Channel (PSFCH). Or, the request message may be transmitted as all or some of data on Physical Sidelink Shared channel (PSSCH). Or, the request message may be transmitted through a reference signal such as CSI-RS (Channel State Information-Reference Signal) or DM-RS (Demodulation-Reference Signal) or a preamble. Meanwhile, a signal for transmitting the request message may include a signal transmitted in a relatively low frequency band (e.g., below 6G) such as 5.9 GHz.

The request message may contain a triggering indicator of beam search, a source ID of a Tx UE, information on a destination ID, and/or information necessary for beam sweeping. For example, the request message may further contain information on a service ID of data to be transceived as information necessary for the beam sweeping, PPPP of data and information on a latency requirement. Or, the request message may further contain information on a start point, time interval, start direction and/or execution direction of beam sweeping preferred by the first or second UE.

In addition, a response message for an initial beam search for Tx/Rx beam acquisition may be configured as follows. Here, the response message may include a response message corresponding to a request message that is the initial beam search request message.

The method of transmitting the response message is non-limited by a signal or channel. For example, the response message may be transmitted on a signal or channel of all or some of a Synchronization Signal Block (SSB) including Primary Synchronization Signal (PSS), Primary Sidelink Synchronization Signal (PSSS), Secondary Synchronization Signal (SSS), Secondary Sidelink Synchronization Signal (SSSS), or Physical Sidelink Broadcast Channel (PSBCH).

Or, the response message may be transmitted as all or some of data on Physical Sidelink Shared Channel (PSSCH). Or, the response message may be transmitted through a reference signal such as CSI-RS (Channel State Information-Reference Signal) or DM-RS (Demodulation-Reference Signal) or a preamble. Meanwhile, the response message may be a signal transmitted in a relatively low frequency band (e.g., below 6G) such as 5.9 GHz.

The response message may contain an acknowledgement indicator for the request message, information on whether to accept a beam sweeping request, and information necessary for beam sweeping. For example, if the request message contains information on a start point, time interval, start direction and/or execution direction preferred by the second UE, the response message may contain information on whether to accept the start point, time interval, start direction and/or execution direction preferred by the second UE. In addition, if a requirement corresponding to at least one of the start point, time interval, start direction and/or execution direction preferred by the second UE is not accepted, another information preferred by the first UE to correspond to the at least one non-preferred requirement may be included in the response message. In this case, if information on a beam sweeping start point or interval preferred by the first UE is included in the response message, the second UE does not further transmit the information on the beam sweeping start point or interval preferred by itself but may perform beam sweeping based on the beam sweeping start point or interval preferred by a Rx UE.

Meanwhile, one of the search timing information and the direction information may be preconfigured (zone based or coverage based), and the other may be exchanged via the initial beam search request message and/or the response message. For example, the Rx UE may determine a start timing of beam sweeping based on the search timing information including a plurality of start points preconfigured to apply in common based on the zone or coverage and perform the beam sweeping based on a start direction and an execution direction forwarded or determined by the request message and/or the response message.

The proposed technology is described on the assumption of a V2V scenario in the present specification, by which the proposed technology is non-limited, and is similarly applicable to network-to-UE communication. The above-described proposed methods may be implemented independently, or some of the proposed methods may be implemented in form of combination (or mergence).

Figure 18:
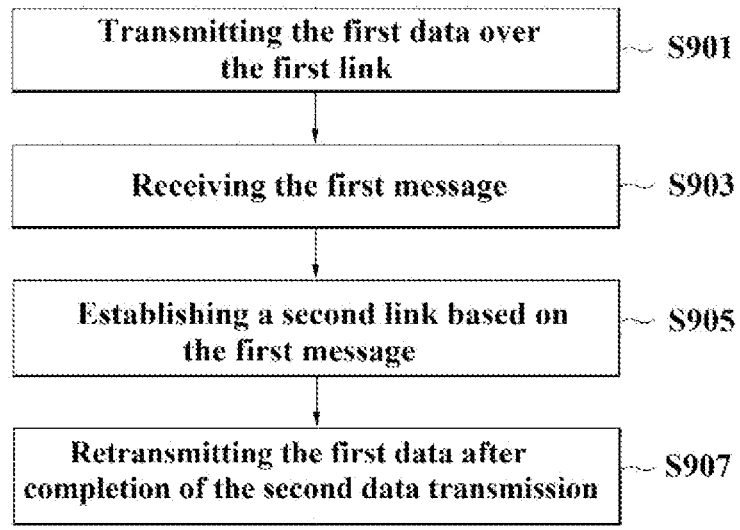
FIG. 18 is a flowchart to describe a method for a Tx UE to resume a transmission of a first data stopped in accordance with a requested new link formation.

FIG. 18 is a flowchart to describe a method for a Tx UE to resume a transmission of a first data stopped in accordance with a requested new link formation.

Referring to FIG. 18, a Tx UE (hereinafter, a first UE) may transmit a first packet (hereinafter, a first data) to a Rx UE (hereinafter, a second UE) over a first link that is formed already [S901]. Here, the first link may means a link by a beam pair configured by beam sweeping or beam search of an mmWave band between the first UE and the second UE. Or, the first UE may receive a first message, which indicates that the reception of the first data according to the first link is stopped, on a Physical Sidelink Feedback Channel (PSFCH) that is a feedback channel related to the first data from the second UE. In this case, the first message may contain the transmission stop of the first data and request information of beam search for new link formation with the second UE.

While transmitting the first packet, the first UE may receive a first message ( ) requesting formation of a new link (hereinafter, a second link) for reception or transmission of a second packet (hereinafter, a second data) from the potential UE (hereinafter, a third UE) or the second UE while transmitting the first packet [S903]. Here, the first message may contain information related to the second link or the beam search. For example, the first message may contain information on a priority, a latency requirement and the like of the second data to transmit in the second link or information on a start timing of beam sweeping related to the beam search, a start direction of the beam sweeping, an execution direction of the beam sweeping and the like.

Meanwhile, as described above, the first message may be transmitted by the third UE and/or the second UE. For clarity of the following description, the third UE is assumed as transmitting the first message.

The first UE may perform the beam sweeping based on the first message and form a second link with the third UE over a new beam pair according to the beam sweeping result [S905]. The first UE may transmit the second data over the second link.

For example, if the information on the start timing is included in the first message, the first UE may check whether a start point corresponding to the start timing exists among a plurality of start points included in the preconfigured timing information. Here, the preconfigured timing information may include information on start points of beam sweeping preconfigured by signaling with the second UE and information on start points of beam sweeping preconfigured based on zone ID or coverage of the first UE. If a start point corresponding to the start timing is confirmed among a plurality of the start points, the first UE may transmit a response message related to acceptance to the second UE. Or, if a start point corresponding to the start timing is not confirmed among a plurality of the start points, the first UE may transmit a response message containing a prescribed one of a plurality of the start points. In this case, the third UE may search for a beam pair for forming the second link with the first UE by performing beam sweeping with the first UE based on the start point included in the response message.

Meanwhile, as described above, the second link is basically formed based on beam sweeping performed in case of completion of transmission of the first data according to the first link. Yet, when a preset condition is met, even if the transmission of the first data is not complete, beam sweeping for the formation of the second link may be performed. Namely, the first UE determines whether the preset condition is met based on the first link and/or the first message. If the preset condition is met, the first UE may stop the transmission of the first data and perform the beam sweeping for the formation of the second link.

Specifically, as described above, the preset condition may include a case that the first link quality is smaller than a first reference threshold, a case that a priority for a second data included in the first message is higher than that for the first data, or a case that a latency requirement for the second data included in the first message is tighter than a latency requirement related to the first data (e.g., a case that the latency requirement for the second data is not met in case of standing by for the formation of the second link until the completion of the transmission of the first data). Here, the first reference threshold may be preset to a threshold capable of expecting that a quality of a link will be degraded later despite having a level not enough to be declared as BEAM FAILURE INSTANCE (BFI). For example, the first reference threshold may be set to a specific threshold (Block Error Rate (BLER)) declaring the beam failure instance for the quality of the link or a value higher than a threshold for RSRP (Reference Signal Received Power), SNR (Signal-to-Noise Ratio) or SINR (Signal to Interference plus Noise Ratio) corresponding to the specific threshold.

If the first link quality is smaller than the first reference threshold, a priority for the second data included in the first message is higher than that for the first data, or a latency requirement for the second data included in the first message is tighter than a latency requirement related to the first data, the first UE may stop the transmission of the first data over the first link and perform the beam sweeping for the second link formation. The first UE may form the second link over a beam pair configured in accordance with performing the beam sweeping with the third UE and then transmit the second data to the third UE over the second link.

In this case, the first UE may determine a beam search timing point with the third UE based on the start point included in the first message. Or, the first UE may transmit a response message, which contains information on a start point for a beam search determined (or preferred) in consideration of the transmission stop timing point of the first data of the first UE, to the third UE. Moreover, the first message may contain information on a start direction and an execution direction of the beam search. In this case, the first UE may perform a beam search with the third UE based on the information on the start point, start direction and execution direction included in the first message. Or, the first UE may transmit a response message, which contains information on at least one of a start point, a start direction and an execution direction preferred by the first UE, to the third UE. Or, as described above, the first UE may determine a start point, a start direction and an execution direction of beam sweeping or beam search with the third UE based on information on preconfigured search timing and preconfigured direction information.

Subsequently, the first UE may retransmit the stopped first data over the first link after completion of the transmission of the second data over the second link formed according to the beam search [S907]. The first UE may retransmit all of the stopped first data or the rest of the first data except the data transmitted until the stop. For example, the first UE may determine whether to retransmit all or some of the first data in consideration of the remaining latency budget for the first data. Meanwhile, for clarity of the description, retransmission data related to the first data is defined as a third data.

The first UE may set a Redundancy Version (RV) of the third data to a value different from an RV for the first data in case of transmitting the third data. This is to inform the second UE that the third data is the retransmission of the first data. Namely, although the transmission of the first data is not complete, the first UE sets an RV different from the RV for the first data in transmitting the third data, thereby informing the second UE that the third data is the retransmission of the stopped first data. In this case, without configuring a separate signaling or indicator to indicate the retransmission of the stopped first data in accordance with the formation of the new link, the first UE may inform the second UE that the third data is the retransmission of the first data using the RV.

Or, the first UE may further include information on an indicator or counter, which indicates the retransmission of the first data, in the third data as well as the RV, thereby informing the second UE that the third data is the retransmission of the stopped first data.

Or, each of the first link and the second link is a link configured for a frequency band above 6 GHz, and the first message may be transceived over a radio link formed in the frequency band below 6 GHz.

Or, if the transmission stop of the first data is attributed to detection of a quality of the first link, which is smaller than the first reference threshold, the first UE may drop the transmission of the first data based on the latency budget related to the first data. For example, the first UE needs a search for a new link for retransmission of the first data due to the quality of the first link. When a beam search related to the new link is performed, if the latency budget is exceeded or expected to be exceeded, the first UE may drop the transmission of the first data (or the third data).

Or, in the aforementioned third or fourth case, the second UE may receive a first message related to a new link formation from the third UE while receiving the first data from the first UE. In this case, as described above, the second UE determines whether a preset condition is met. If the preset condition is met, the second UE stops the reception of the first data and perform beam sweeping for formation of a new link in accordance with the first message. In this case, the second UE may transmit a second message containing information on the reception stop of the first data to the first UE. The second message may be transmitted on Physical Sidelink Feedback Channel (PSFCH) that is a feedback channel related to the first data. Moreover, if reception or transmission of the second data is complete over the new link formed based on the first message, the second UE may transmit a third message requesting retransmission of the first data to the first UE. Or, the second UE estimates a timing point of completing the transmission of the second data and may then forward the second message to the first UE in a manner that a timing point of performing the retransmission of the first data is included in the second message in advance based on the estimated completion timing point.

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
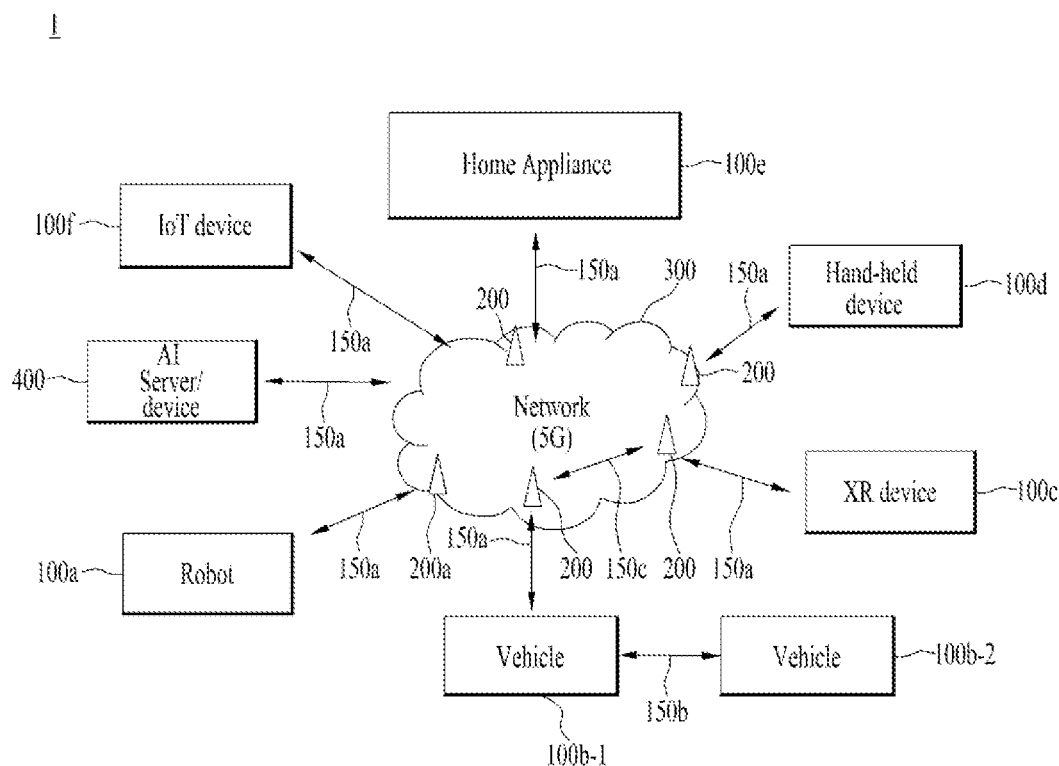
FIG. 19 illustrates a communication system applied to the present invention.

FIG. 19 illustrates a communication system applied to the present invention.

Referring to FIG. 19, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of wireless devices to which the present invention is applied

FIG. 20 illustrates a wireless device applicable to the present invention.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, the UE may include a processor 102 connected to the RF transceiver and a memory 104. The memory 104 may include at least one or more programs capable of executing operations related to the embodiments described in FIGS. 15 to 18.

The processor 102 controls the RF transceiver to transmit a first data to a second UE over a first link, receive a first message requesting a beam search, and transmit a second data over a second link formed based on the first message. If transmission of the first data is stopped for formation of the second link, the processor 102 may transmit a third data, which is retransmission of the first data, after completion of the transmission of the second data. In this case, the third data may be transmitted in a manner that a second RV different from a first RV set for the first data is set for the third data. In addition, the processor 102 may perform embodiments related to the new link forming method and the stopped data transmitting method described in FIGS. 15 to 18 based on the program included in the memory 104.

Or, a chipset including the processor 102 and the memory 104 may be configured. In this case, the chipset includes at least one processor and at least one memory operatively connected to the at least one processor and enabling the at least one processor to perform an operation when executed. The operation includes transmitting a first data to a second UE over a first link, receiving a first message requesting a beam search, transmitting a second data over a second link formed based on the first message, and transmitting a third data, which is retransmission of the first data, after completion of the transmission of the second data if the transmission of the first data is stopped for formation of the second link. The third data may be transmitted in a manner that a second RV different from a first RV set for the first data is set for the third data. In addition, the operation may perform embodiments related to the new link forming method and the stopped data transmitting method described in FIGS. 15 to 18 based on the program included in the memory 104.

Or, a computer-readable storage medium including at least one computer program to enable the at least one processor to perform an operation is provided. The operation includes transmitting a first data to a second UE over a first link, receiving a first message requesting a beam search, transmitting a second data over a second link formed based on the first message, and transmitting a third data, which is retransmission of the first data, after completion of the transmission of the second data if the transmission of the first data is stopped for formation of the second link. The third data may be transmitted in a manner that a second RV different from a first RV set for the first data is set for the third data. In addition, the computer program may include programs capable of performing operations of embodiments related to the new link forming method and the stopped data transmitting method described in FIGS. 15 to 18.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 21:
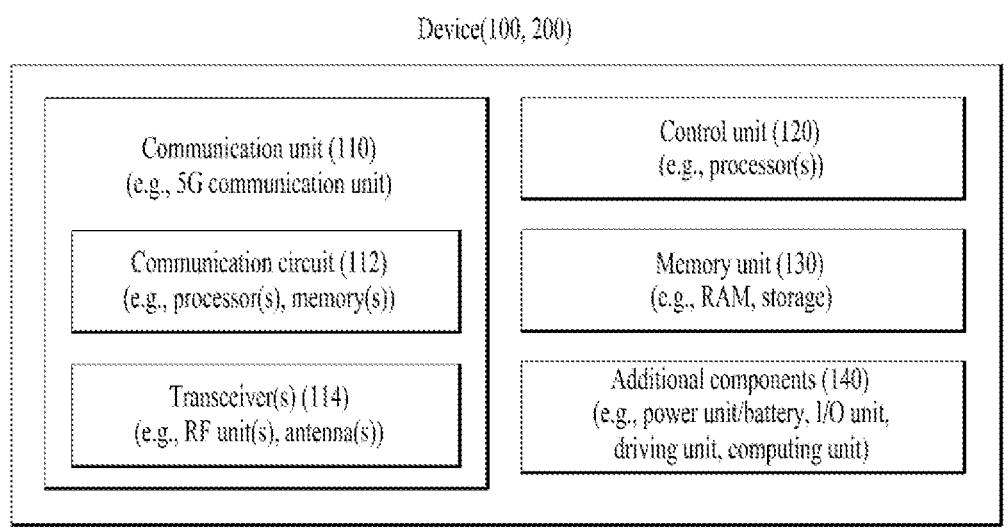
FIG. 21 illustrates another example of a wireless device to which the present invention is applied. The wireless device may be implemented in various forms according to use-examples/services.

FIG. 21 illustrates another example of a wireless device applied to the present invention. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Examples of Mobile Devices to which the Present Invention is Applied

Figure 22:
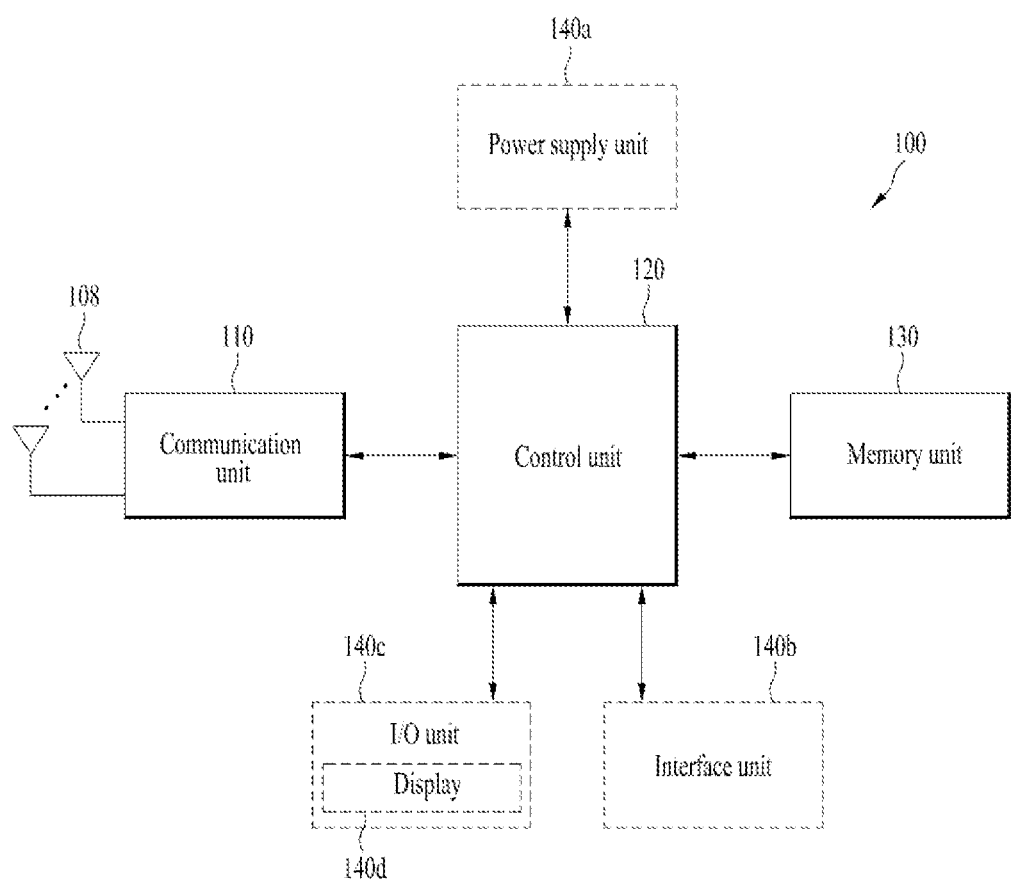
FIG. 22 illustrates a hand-held device applied to the present invention.

FIG. 22 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
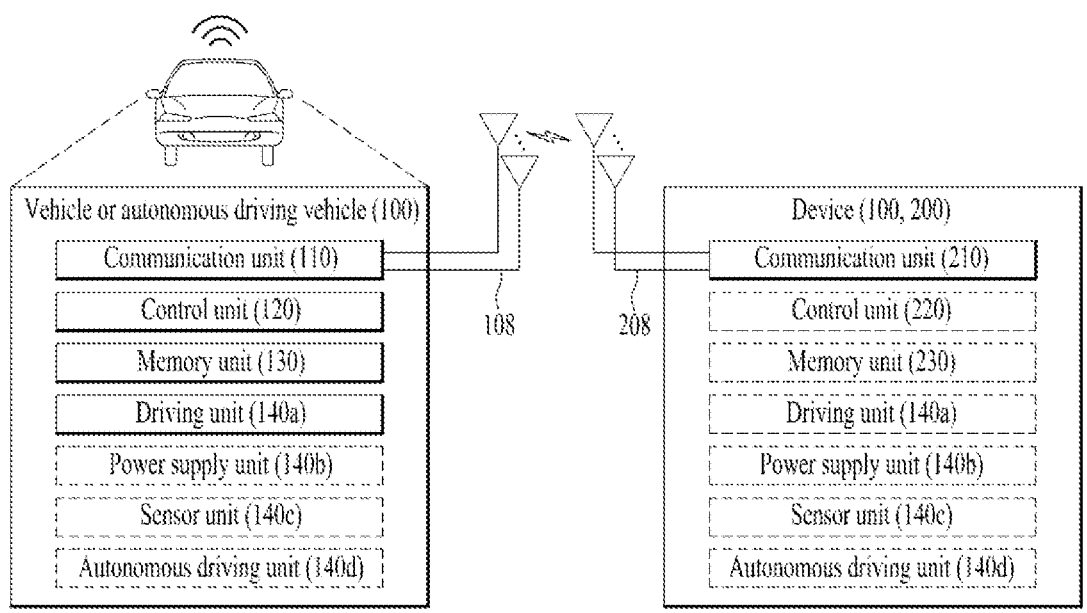
FIG. 23 illustrates a vehicle or an autonomous driving vehicle applied to the present invention.

Examples of Vehicles or Autonomous Vehicles to which the Present Invention is Applied FIG. 23 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:
1. A method of transmitting data by a first User Equipment (UE) in a wireless communication system supportive of a sidelink, the method comprising:
receiving configuration information for the sidelink,
wherein the configuration information includes information related to a sidelink synchronization signal (SLSS), Uplink/Downlink (UL/DL) configuration, and a resource pool;
selecting first transmission resources for transmitting first data based on the configuration information;
transmitting the first data using the first transmission resources to a second UE through a first link; and
receiving a first message related to forming a second link,
wherein, based on a priority for second data to be transmitted through the second link being higher than a priority for the first data, the transmission of the first data is stopped to perform a beam sweeping for forming the second link.
2. The method of claim 1, based on a completion of transmission of the second data after the transmission of the first data is stopped, transmitting third data for a retransmission of the first data,
wherein the third data is transmitted by configuring a second redundancy version (RV) different from a first RV configured in the first data, and
wherein information regarding the second RV comprises information indicating that the third data is the retransmission of the first data.
3. The method of claim 2, wherein the third data further comprises information regarding an indicator ora counter indicating the retransmission of the first data.
4. The method of claim 2, wherein, based on a latency requirement related to the first data, the third data comprises whole data of the first data or data remaining from the first data except for the first data already transmitted.
5. The method of claim 1, wherein the first message contains information on at least one of a priority and latency requirement for the second data.
6. The method of claim 1, wherein, based on the first message received on a physical sidelink feedback channel (PSFCH) related to a feedback of the first data from the second UE, the first UE immediately stops the transmission of the first data to perform the beam sweeping for forming the second link.
7. The method of claim 6, wherein, if a start point corresponding to a first start point included in the first message does not exist among a plurality of start points included in preconfigured timing information acquired based on an ID of a zone having the first UE located therein, the first UE selects a start point closest to the first start point among the plurality of the start points and transmits third data including information regarding the selected start point.
8. The method of claim 1, wherein the first message is received in a frequency band below 6 GHz and wherein the first data and the second data are transmitted or received in a frequency band above 6 GHz.
9. A first User Equipment (UE) transmitting data in a wireless communication system supportive of a sidelink, the first UE comprising:
a Radio Frequency (RF) transceiver; and
a processor connected to the RF transceiver,
wherein the processor is configured to:
control the RF transceiver to receive configuration information for the sidelink,
select first transmission resources for transmitting first data based on the configuration information, control the RF transceiver to transmit the first data using the first transmission resources to a second UE through a first link, control the RF transceiver to receive a first message related to forming a second link, wherein the configuration information includes information related to a sidelink synchronization signal (SLSS), Uplink/Downlink (UL/DL) configuration, and a resource pool, and wherein, based on a priority for second data to be transmitted through the second link being higher than a priority for the first data, the transmission of the first data is stopped to perform a beam sweeping for forming the second link.

10. A chipset for controlling a first User Equipment (UE) to transmit data in a wireless communication system supportive of a sidelink, the chipset comprising:

at least one processor; and at least one memory operatively connected to the at least one processor and enabling the at least one processor to perform an operation when executed, the operation comprising:

receiving configuration information for the sidelink, wherein the configuration information includes information related to a sidelink synchronization signal (SLSS), Uplink/Downlink (UL/DL) configuration, and a resource pool;

selecting first transmission resources for transmitting first data based on the configuration information;

transmitting the first data using the first transmission resources to a second UE through a first link;

receiving a first message related to forming a second link; and wherein, based on a priority for second data to be transmitted through the second link being higher than a priority for the first data, the transmission of the first data is stopped to perform a beam sweeping for forming the second link.

* * * * *